US008020516B2

(12) United States Patent
Labra Reynolds

(10) Patent No.: US 8,020,516 B2
(45) Date of Patent: Sep. 20, 2011

(54) DEVICE AND METHOD FOR THE CAPTURE OF LARVAE AND THE SEA-CULTURE OF SEA URCHINS AND ABALONE

(76) Inventor: Susana Labra Reynolds, Viña del Mar (CL)

( * ) Notice: Subject to any disclaimer, the term of this patent is extended or adjusted under 35 U.S.C. 154(b) by 338 days.

(21) Appl. No.: 12/060,355

(22) Filed: Apr. 1, 2008

(65) Prior Publication Data
US 2008/0257275 A1 Oct. 23, 2008

(30) Foreign Application Priority Data

Mar. 29, 2007 (CL) ..................................... 852-2007

(51) Int. Cl.
*A01K 61/00* (2006.01)
(52) U.S. Cl. ........................................................ 119/238
(58) Field of Classification Search .................. 119/204, 119/234, 236, 238, 239, 215, 223; D30/131, D30/199
See application file for complete search history.

(56) References Cited

U.S. PATENT DOCUMENTS

| | | | | |
|---|---|---|---|---|
| 2,302,336 A * | 11/1942 | MacDonald | ................... | 119/214 |
| 3,029,785 A * | 4/1962 | Maheo | ........................... | 119/238 |
| 3,316,881 A * | 5/1967 | Fischer | ......................... | 119/238 |
| 3,650,244 A * | 3/1972 | Fordham | ....................... | 119/237 |
| 3,658,034 A * | 4/1972 | Day et al. | ...................... | 119/209 |
| 3,724,423 A * | 4/1973 | Day et al. | ...................... | 119/209 |
| 3,889,639 A * | 6/1975 | Day et al. | ...................... | 119/211 |
| 3,985,101 A * | 10/1976 | Thompson | .................... | 119/207 |
| 4,003,338 A * | 1/1977 | Neff et al. | ..................... | 119/223 |
| 4,061,110 A * | 12/1977 | Steidle | .......................... | 119/241 |
| 4,079,698 A * | 3/1978 | Neff et al. | ..................... | 119/223 |
| 4,182,270 A * | 1/1980 | Fourcher | ....................... | 119/238 |
| 4,253,418 A * | 3/1981 | Lockwood et al. | ........... | 119/236 |
| 4,270,488 A * | 6/1981 | Kennedy | ....................... | 119/238 |
| 4,395,970 A * | 8/1983 | Kunkle et al. | ................. | 119/240 |
| 4,559,902 A * | 12/1985 | Mason et al. | ................. | 119/209 |
| 4,982,697 A * | 1/1991 | Neff | .............................. | 119/200 |
| 5,104,803 A * | 4/1992 | Delente | ...................... | 435/292.1 |
| 5,156,111 A * | 10/1992 | Heggelund | .................... | 119/218 |
| 5,269,254 A * | 12/1993 | Gagliano et al. | .............. | 119/237 |
| 5,515,813 A * | 5/1996 | Wilkerson | ..................... | 119/223 |
| 5,628,280 A * | 5/1997 | Ericsson | ....................... | 119/239 |
| 5,758,602 A * | 6/1998 | Fuglsang | ....................... | 119/223 |
| 5,967,086 A * | 10/1999 | Knott, Sr. | ...................... | 119/223 |
| 6,089,191 A * | 7/2000 | Calinski et al. | ............... | 119/221 |
| 6,119,630 A * | 9/2000 | Lobsiger et al. | .............. | 119/238 |
| 6,539,894 B1 * | 4/2003 | Byrne et al. | .................. | 119/234 |
| 6,582,612 B1 * | 6/2003 | White et al. | .................. | 210/747 |
| 7,144,196 B1 * | 12/2006 | Campbell et al. | .............. | 405/30 |

* cited by examiner

*Primary Examiner* — Rob Swiatek
*Assistant Examiner* — Ebony Evans
(74) *Attorney, Agent, or Firm* — Eric Hanscom; Todd J. Langford

(57) ABSTRACT

A device and method for the sea-based culture of sea urchins and abalones includes two parallel lateral elements, where each one of their ends has a groove and a hole for the installation of four braces. The center areas of the braces have a plurality of parallel and equidistant guides for the installation of a plurality of vertically inserted plates, forming spaces between the plates that permit housing sea urchins or abalones on both faces of such plates. At the bottom of the device a horizontal tray holds algae for feeding sea urchins and the abalones; wherein, both the plurality of plates and the tray are enclosed in an elongated mesh, wherein the ends of the mesh are joined to the ends of the lateral walls of the tray, such that the length of the mesh wraps around the plurality of plates.

19 Claims, 29 Drawing Sheets

DEVICE AND METHOD FOR THE CAPTURE OF LARVAE AND THE SEA-CULTURE OF SEA URCHINS AND ABALONE

FIELD OF THE INVENTION

The present invention relates to the culture of sea urchins and abalone in general, and more specifically to a device and method for the capture of larvae and the sea-culture of sea urchins and abalone.

DESCRIPTION OF PRIOR ART

Today the culture of sea urchins and abalones is primarily based on the concept of a series of parallelly- and vertically-oriented plastic plates. These devices are hand-made, thus incurring high labor costs and a long response time for their construction and maintenance.

An alternative to the previous device is a culture center (or hatchery) for sea urchins and abalone, in which a series of parallel perforated plates are joined by a pipe which passes through them. This device presents problems in the management of the culture: to access a plate in the center, one must remove all the previous plates, thus stressing the sea urchins or abalones contained therein.

Furthermore, sea urchins and abalones are organisms that like to be in the shade, and the previous hatchery alternative does not protect them from the sun. Therefore, depending upon the location of the device, it must be covered by an extra shade-producing component. Additionally the device is designed to be used in tanks for inland culture, thus requiring for its use extensive infrastructure and a large initial investment. The typical infrastructure requirements include water and air pumps, tanks, and a laboratory for egg and larvae production.

On the other hand, abalone sea-culture is also used. In this case, abalone seed production (from fertilized eggs and larvae) is performed in hatcheries and the abalone seeds (juvenile larvae) are inserted into culture systems for "grow-out" to maturity in the sea. The most common system utilizes cylindrical plastic water tanks in which part of the walls have been perforated to allow water flow. The abalone is inserted in the water tank, where it is fed by the introduction of algae through the tank lid. This system presents problems due to the reduced culture area as dictated by the limited volume of the tanks.

The insertion of abalone seeds into plates is yet another system that is starting to be used. These plates are introduced into a metal cage that has guides to receive them, resulting in a series of parallelly-oriented plates. The plates are heavy, due to their dimensions and the materials used for their manufacture, which complicates their handling. The cage presents similar problems, due to its dimensions and weight, which make it difficult to transport.

SUMMARY OF THE INVENTION

The present invention provides a device and method for the capture and attachment of larvae of sea urchins and abalones, and the culture of these organisms, for use in sea-culture. This device is composed of at least two lateral elements that have a groove to introduce braces, such braces each having holes for their attachment to join both lateral elements and forming a plurality of guides, equidistantly separated, for the insertion within of rectangular plates. These plates have a flange along the top length of their rectangular shape, and upon insertion of the plates into the guides, a distribution of parallelly-oriented plates is formed, such plates being joined at their base by a plate retention pin which is introduced into two holes in the base of the rectangular plate, for its attachment to the assembly formed by the lateral elements and the braces. The lateral elements each have an anchor fin with 3 holes, of which 2 adjacent holes and the corresponding 2 adjacent holes of the other lateral element, are used to attach the anchorage to the "mother line", and the remaining hole remains free, permitting the device to act like an underwater weathervane, that is, allowing it to turn to face the current, and in this way offering a constant exchange of interior and exterior water (with benefits of greater oxygenation and cleaning) and greater protection of the cultivated organisms by offering less resistance to the sea.

Lastly, a tray is located in the base of the device, such tray which covers part of the plates and is located in one end of the plate configuration. Then the previously mentioned plates and tray are wrapped in mesh.

As such, the present invention has the principal objective of permitting the culture of sea urchins and abalones with lower initial investment through the use of a device which is largely industrially-produced.

An additional objective is to facilitate the transport, installation, storage and handling of the device, through its composition of lightweight parts which are assembled and disassembled to facilitate transport, storage and stacking.

Yet another objective consists of facilitating the operations of culture and harvest through the use of lightweight plates inserted into guides, each plate having a flange to isolate it and, at the same time, to deliver shade to the surfaces where the sea urchins or abalones live.

DETAILED DESCRIPTION OF THE PREFERRED EMBODIMENTS

Figure 1:
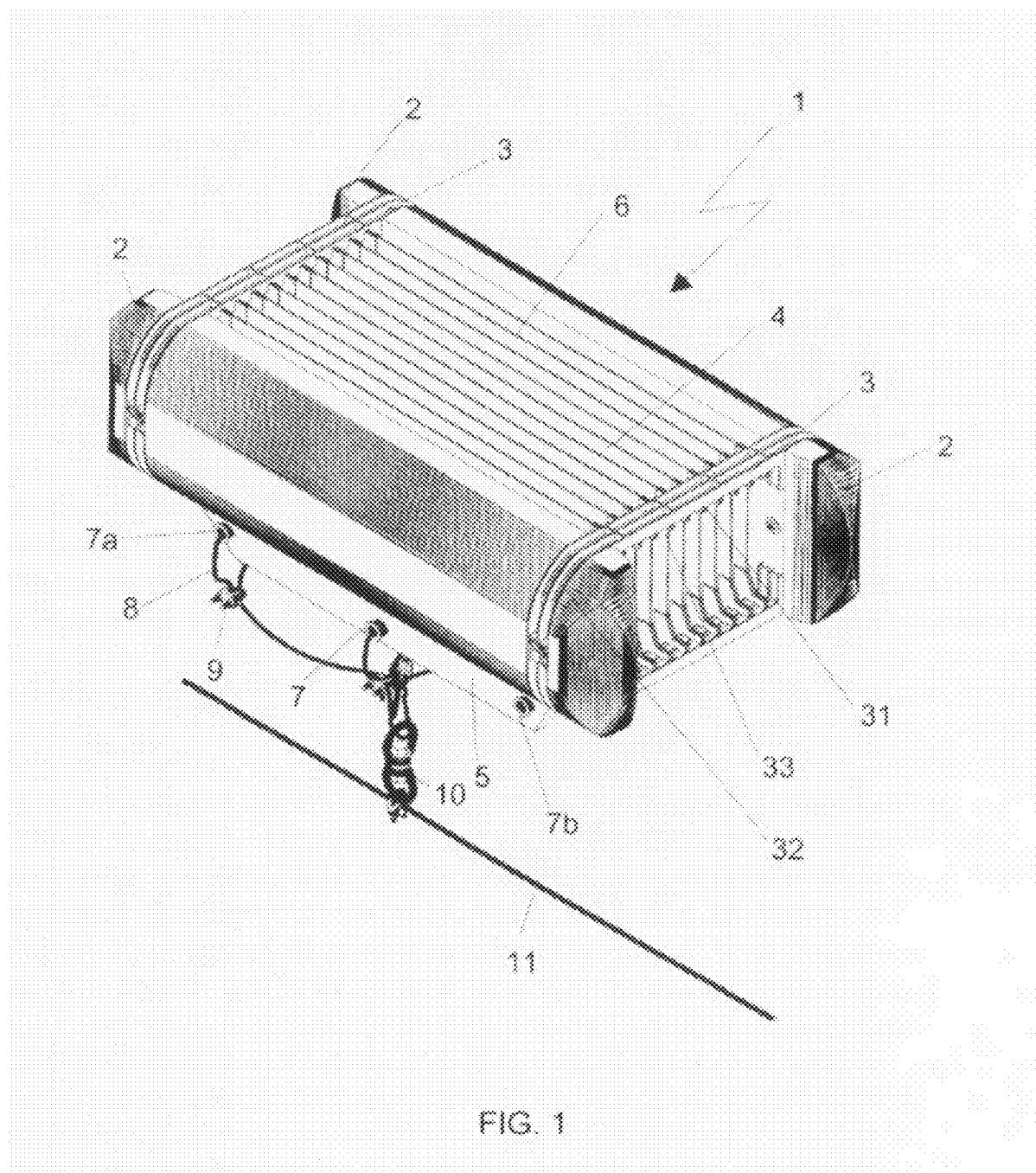
FIG. 1 shows a top perspective view of the device of the present invention, with the protective mesh of the first preferred embodiment of the invention.
Figure 2:
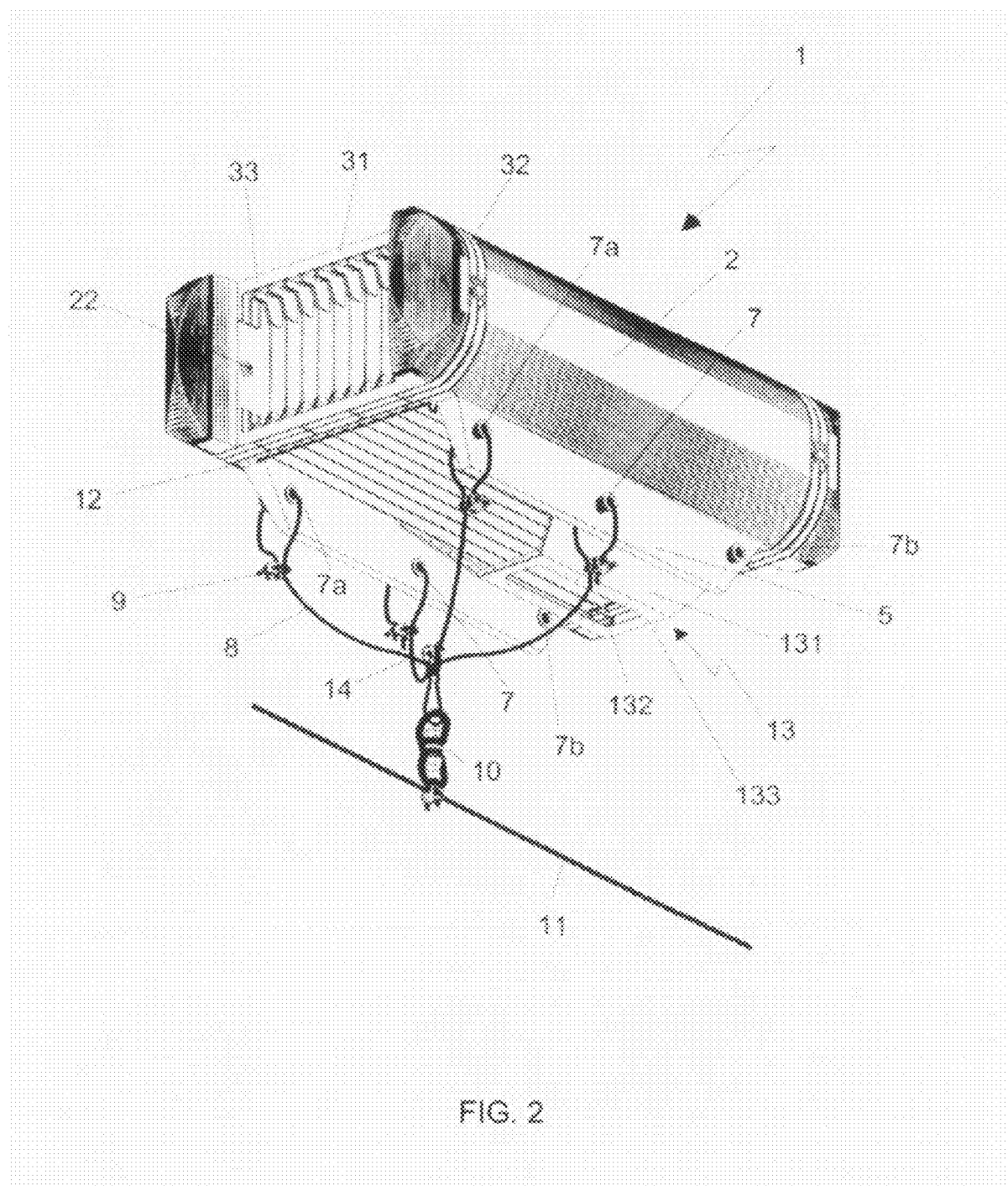
FIG. 2 shows a bottom perspective view of the device of the present invention, without the protective mesh of the first preferred embodiment of the invention.
Figure 3:
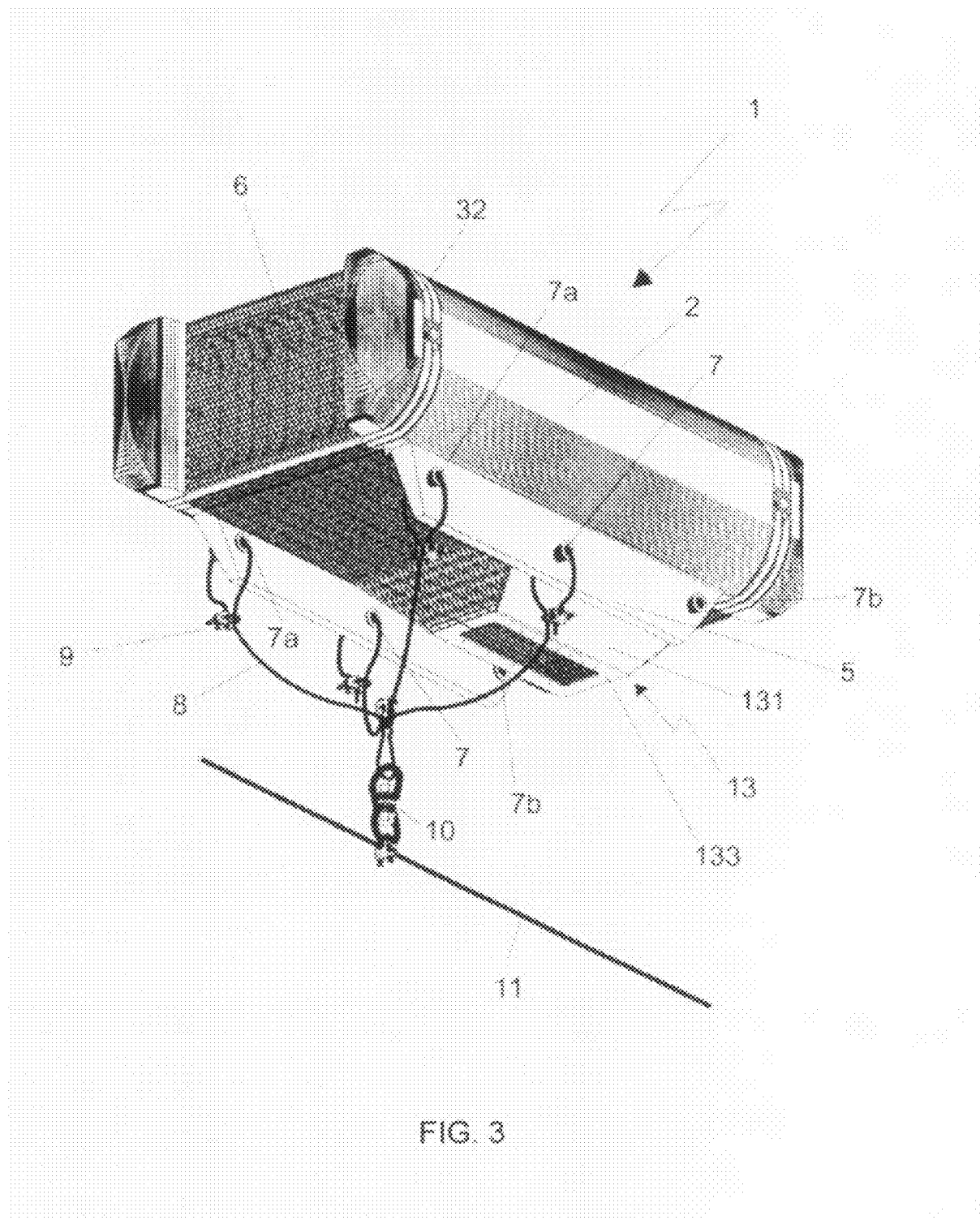
FIG. 3 shows a bottom perspective view of the device of the present invention, with the protective mesh of the first preferred embodiment of the invention.
Figure 4:
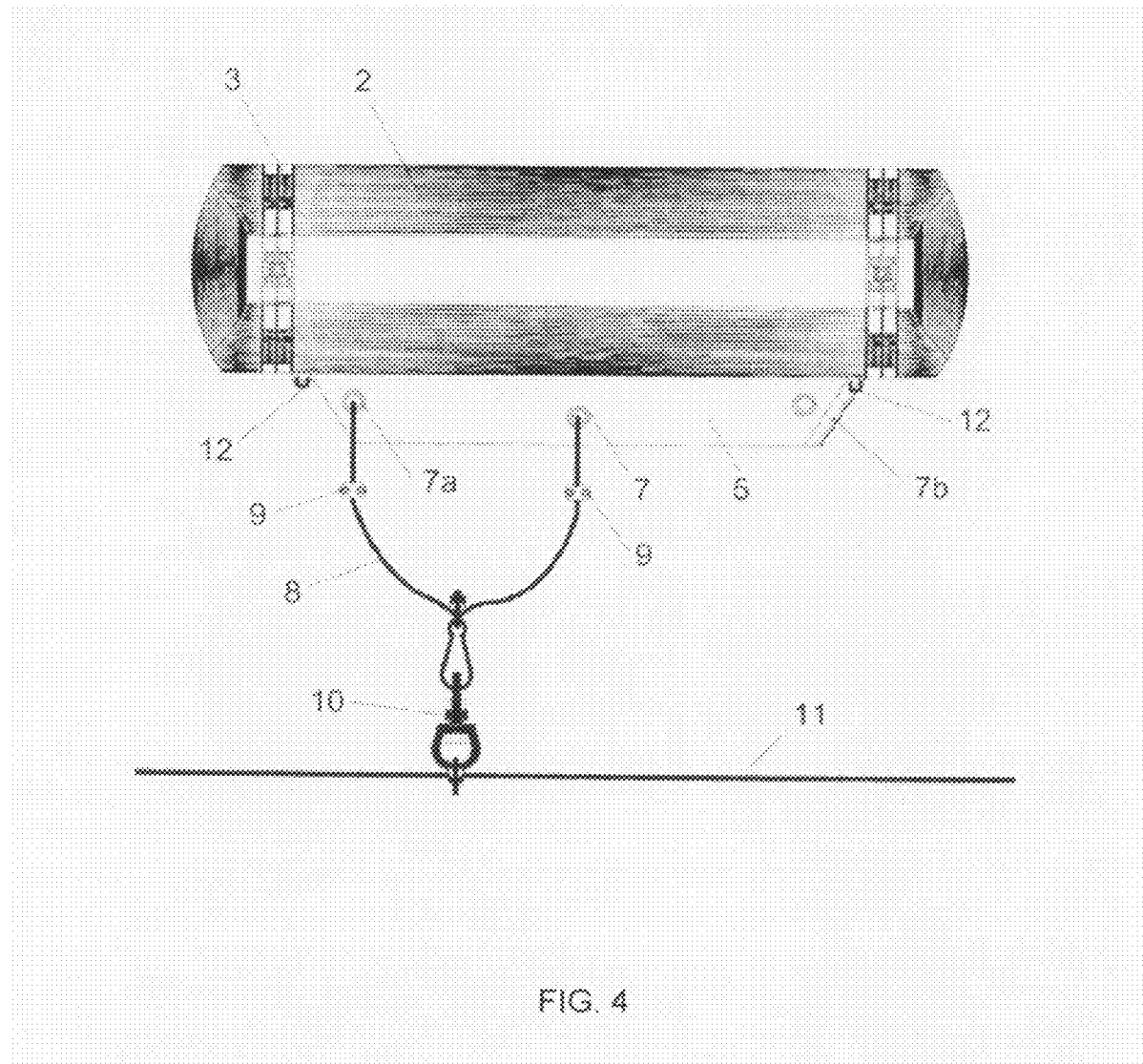
FIG. 4 shows a side view of the device depicted in FIG. 1.
Figure 5A:
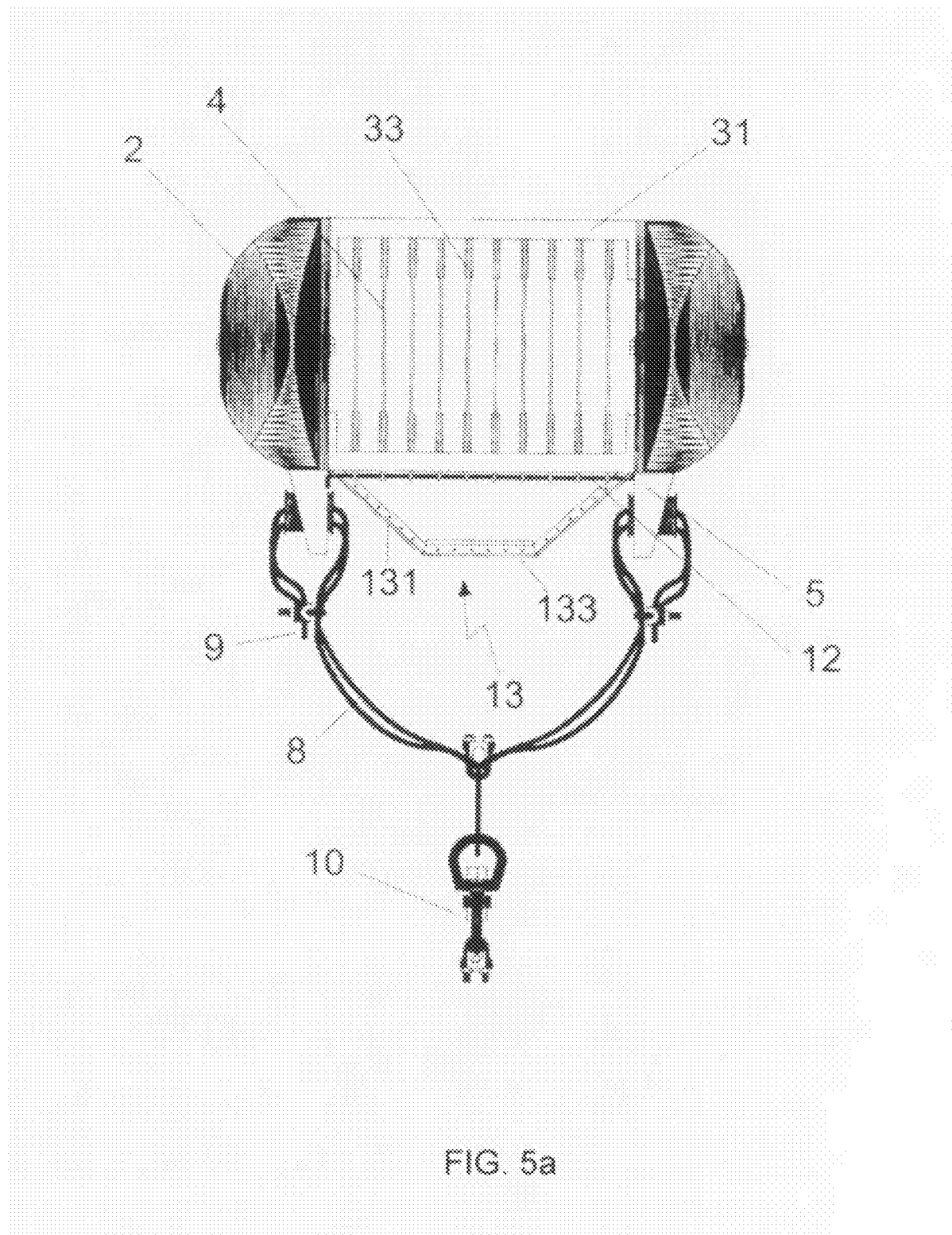
FIG. 5a shows a front view of the device depicted in FIG. 1, with all of its plates installed.
Figure 5B:
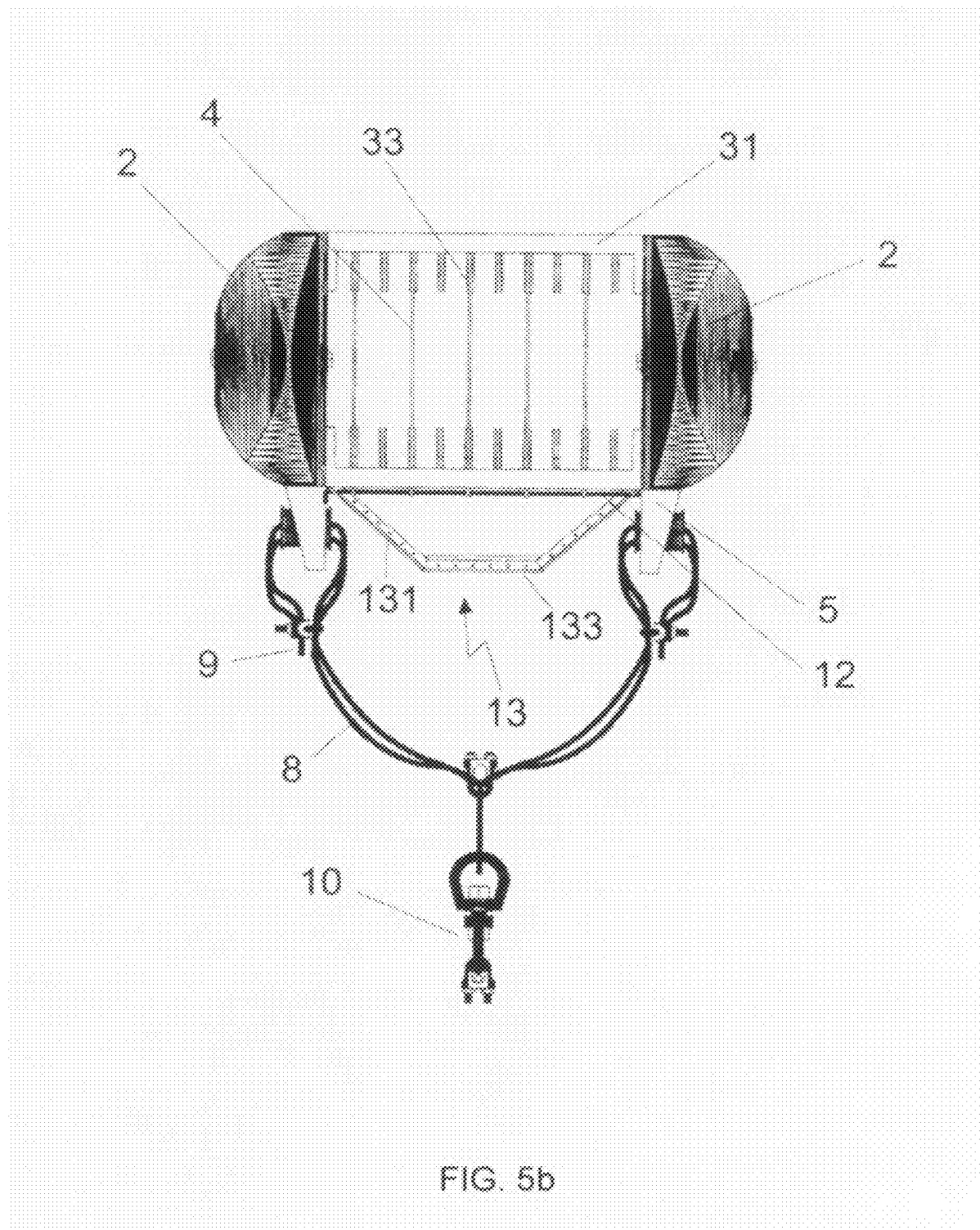
FIG. 5b shows a front view of the device depicted in FIG. 1, with plates installed in every other guide (only alternate guides utilized).
Figure 6:
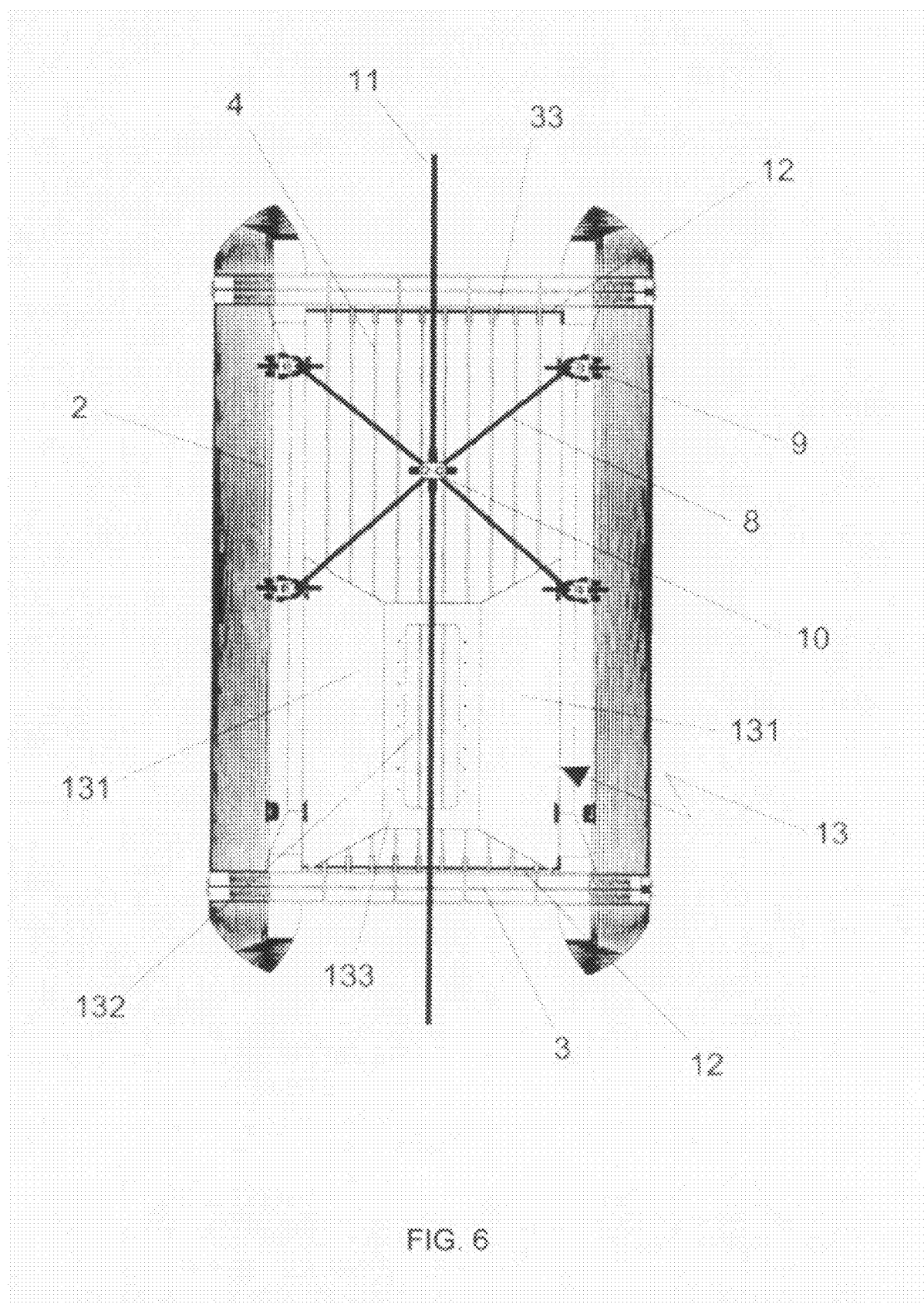
FIG. 6 shows a bottom view of the device depicted in FIG. 1, as it is installed for use, and without the protective mesh.
Figure 7:
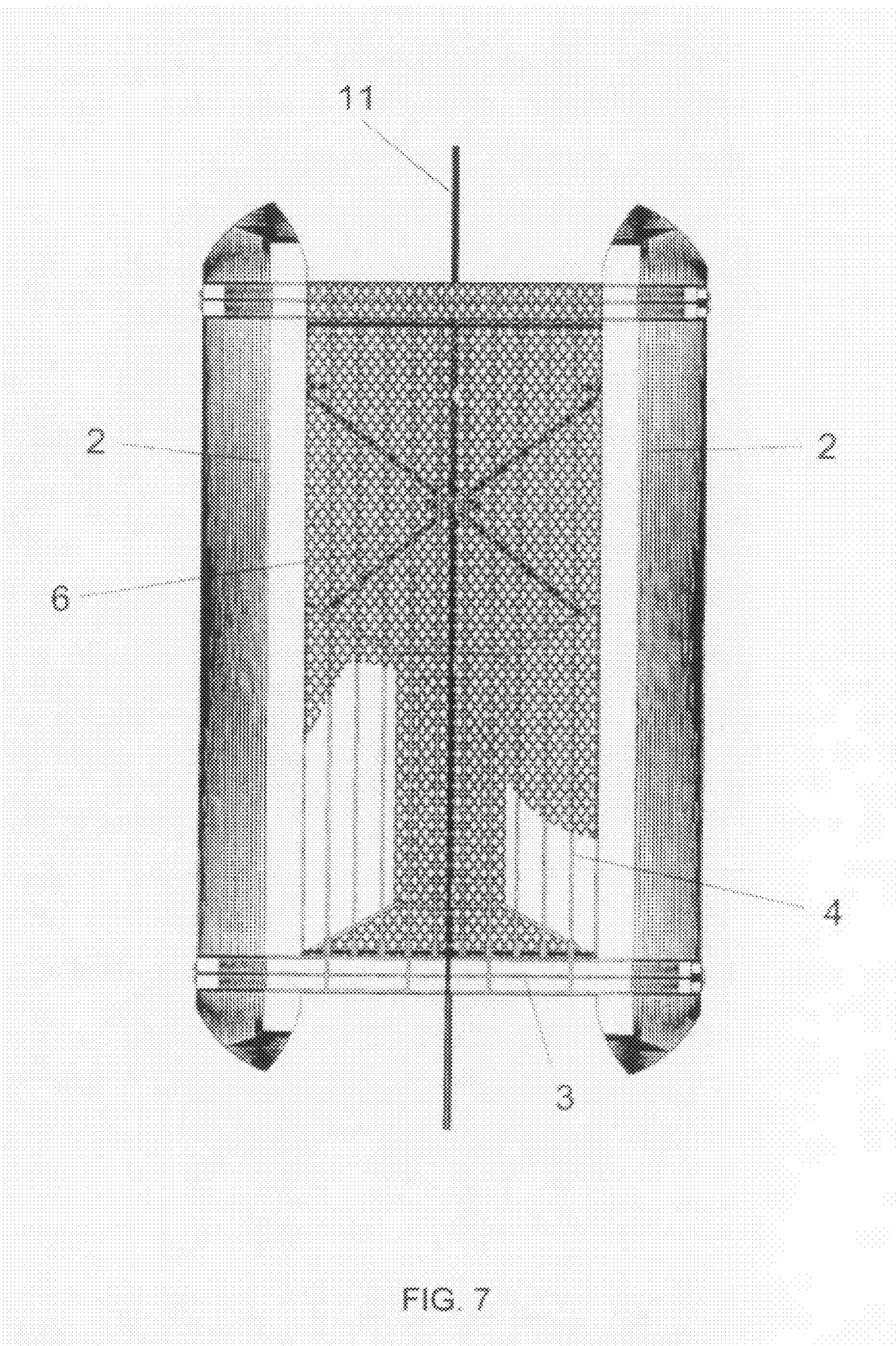
FIG. 7 shows a top view of the device depicted in FIG. 1, as it is installed for use, and with the protective mesh.
Figure 8:
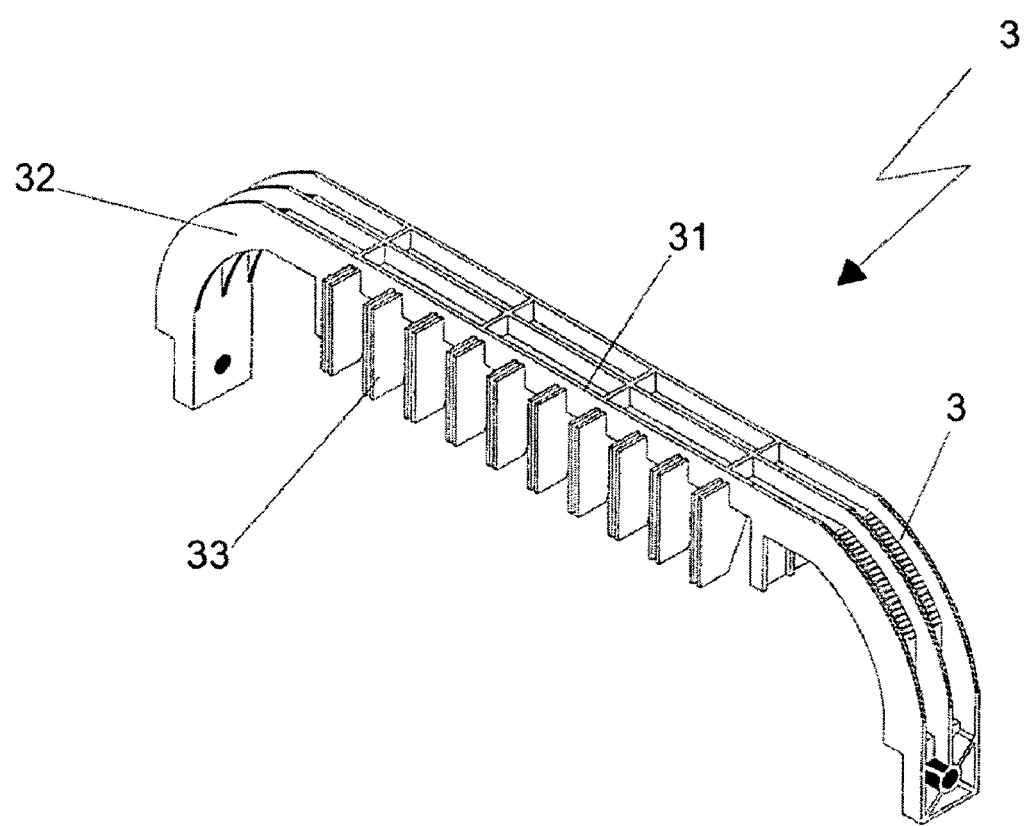
FIG. 8 shows a perspective view of a brace of the device depicted in FIG. 1.
Figure 9A:
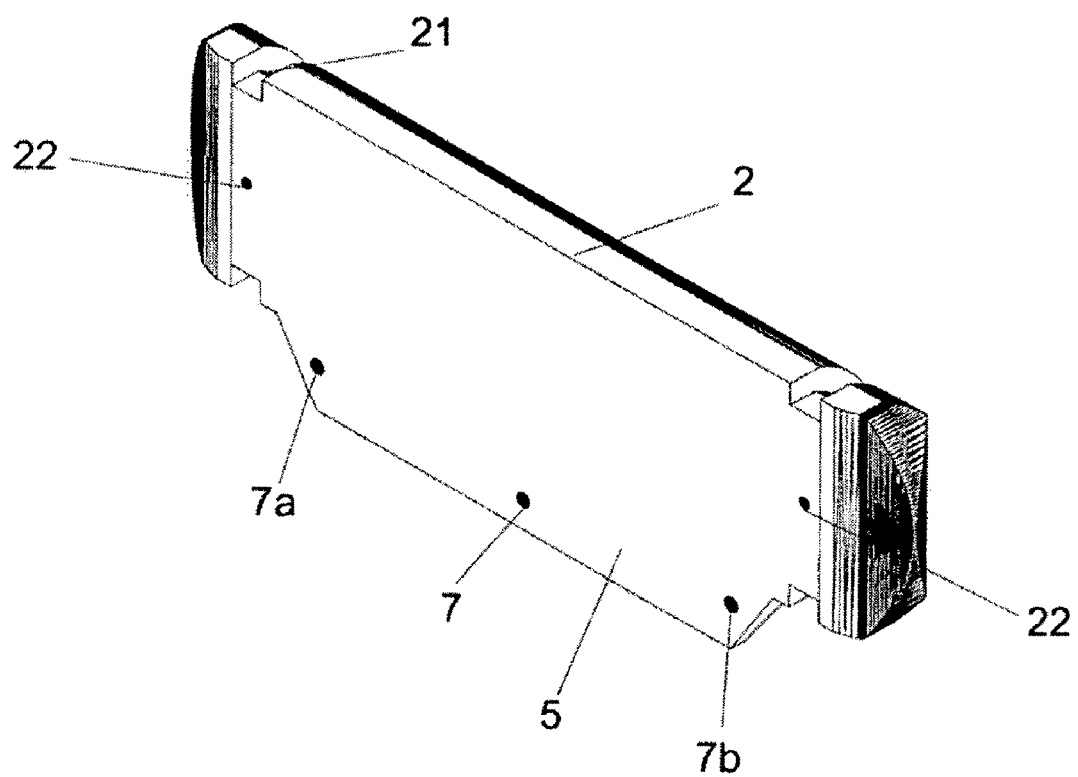
FIGS. 9a and 9b show perspective views of a lateral buoyant element of the device depicted in FIG. 1, presenting views of both internal and external-facing sides of such lateral buoyant element, respectively.
Figure 9B:
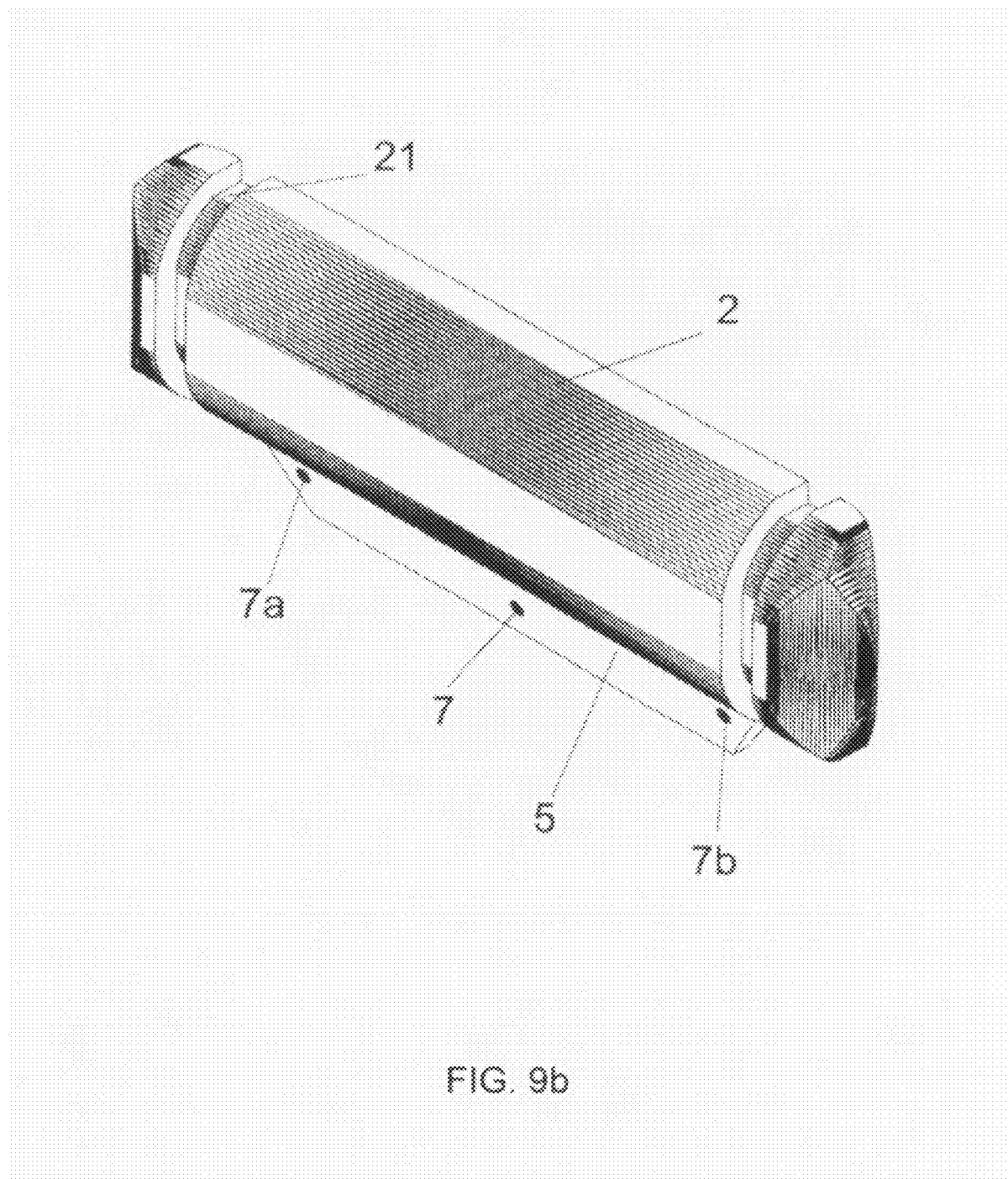
Figure 10:
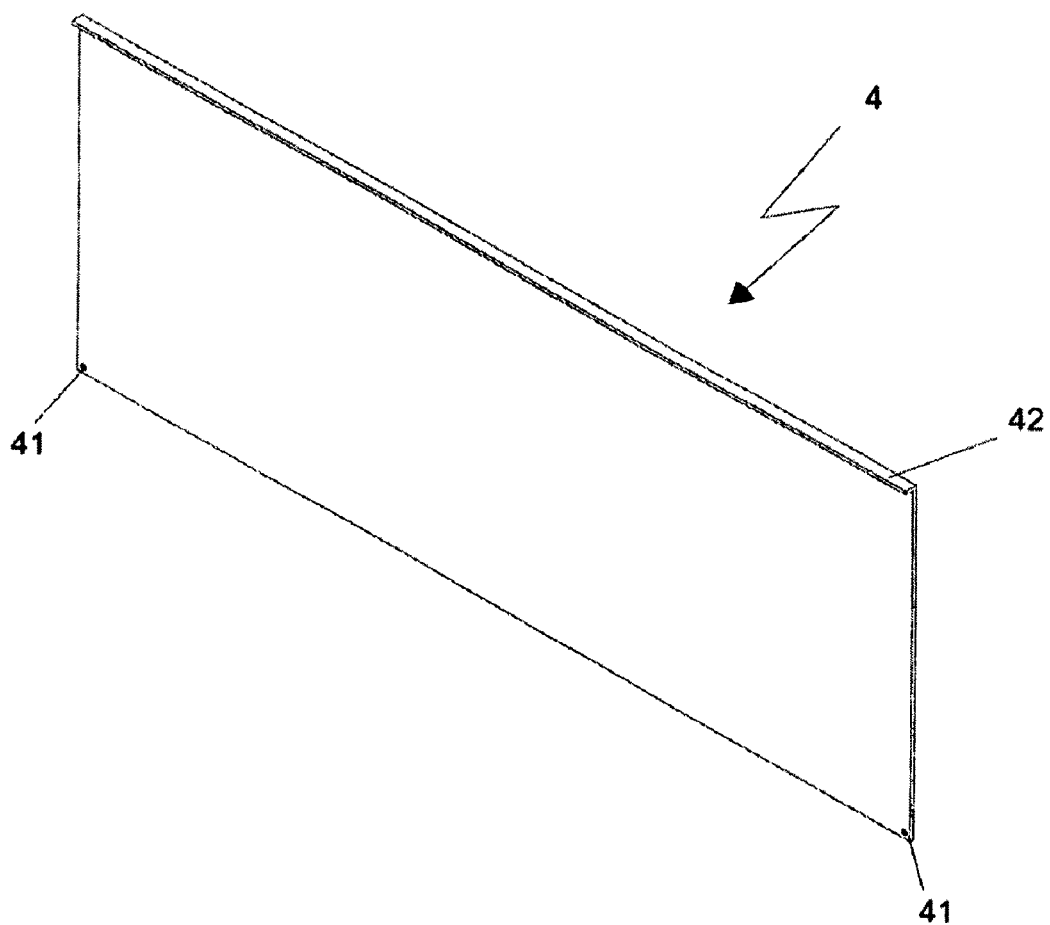
FIG. 10 shows a perspective view of a plate of the device depicted in FIG. 1.
Figure 11:
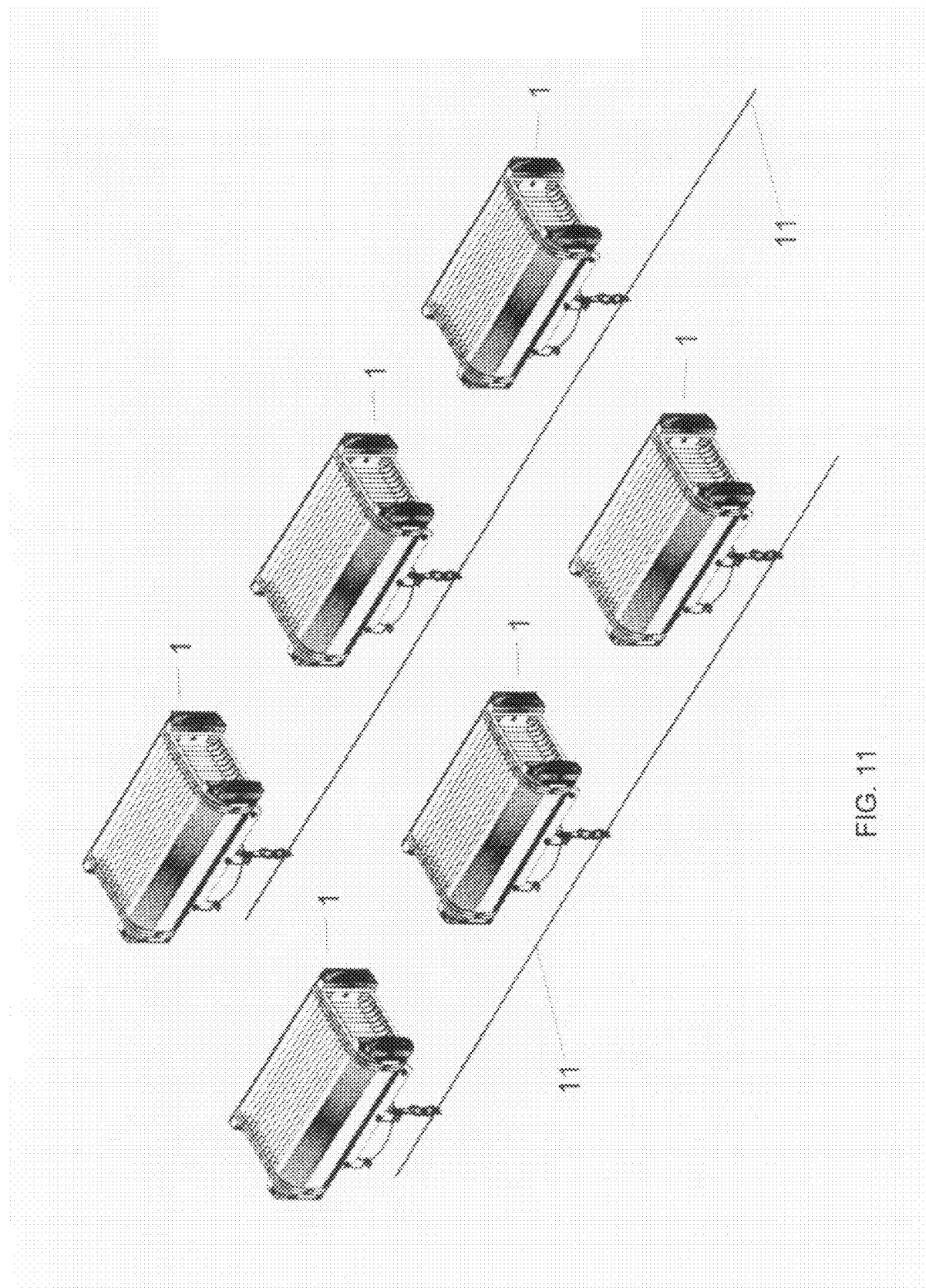
FIG. 11 shows a general diagram of a sea-culture system using the devices of FIG. 1.
Figure 12:
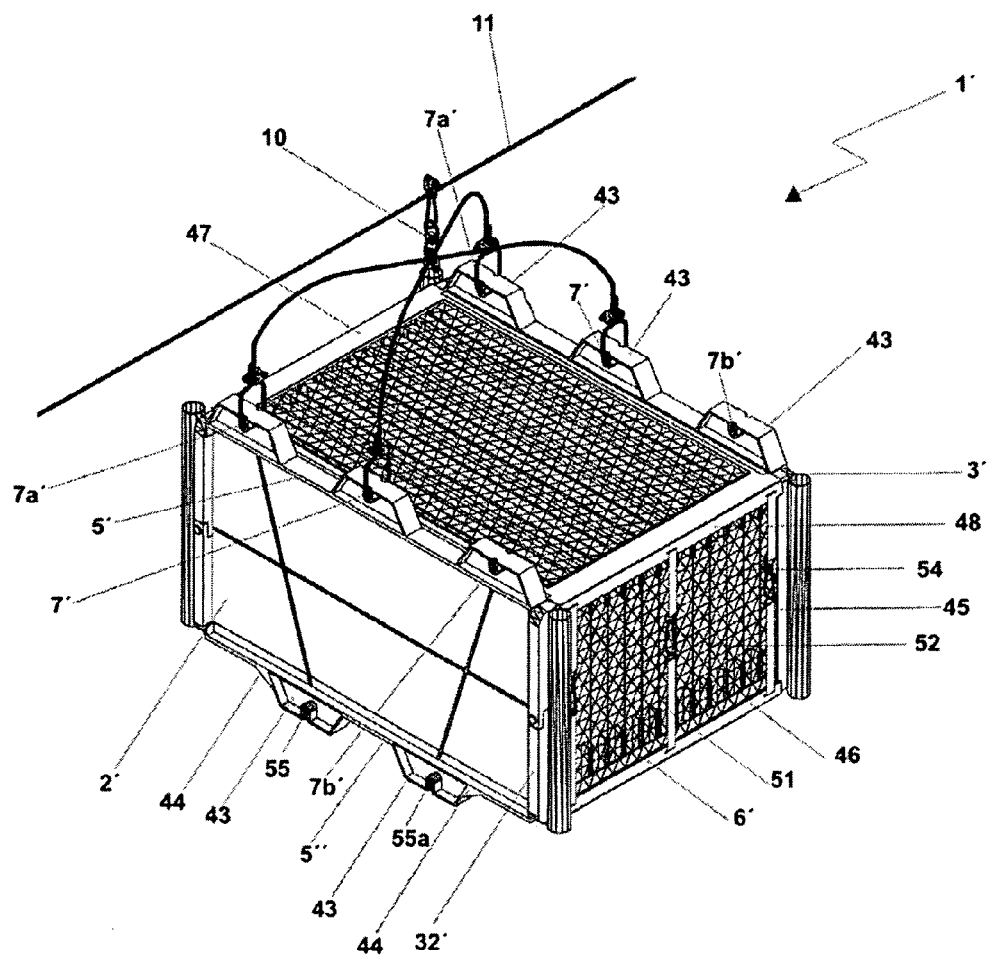
FIG. 12 shows a top perspective view of the second preferred embodiment of the present invention, which includes the lid, lateral mesh covers and tray.
Figure 13:
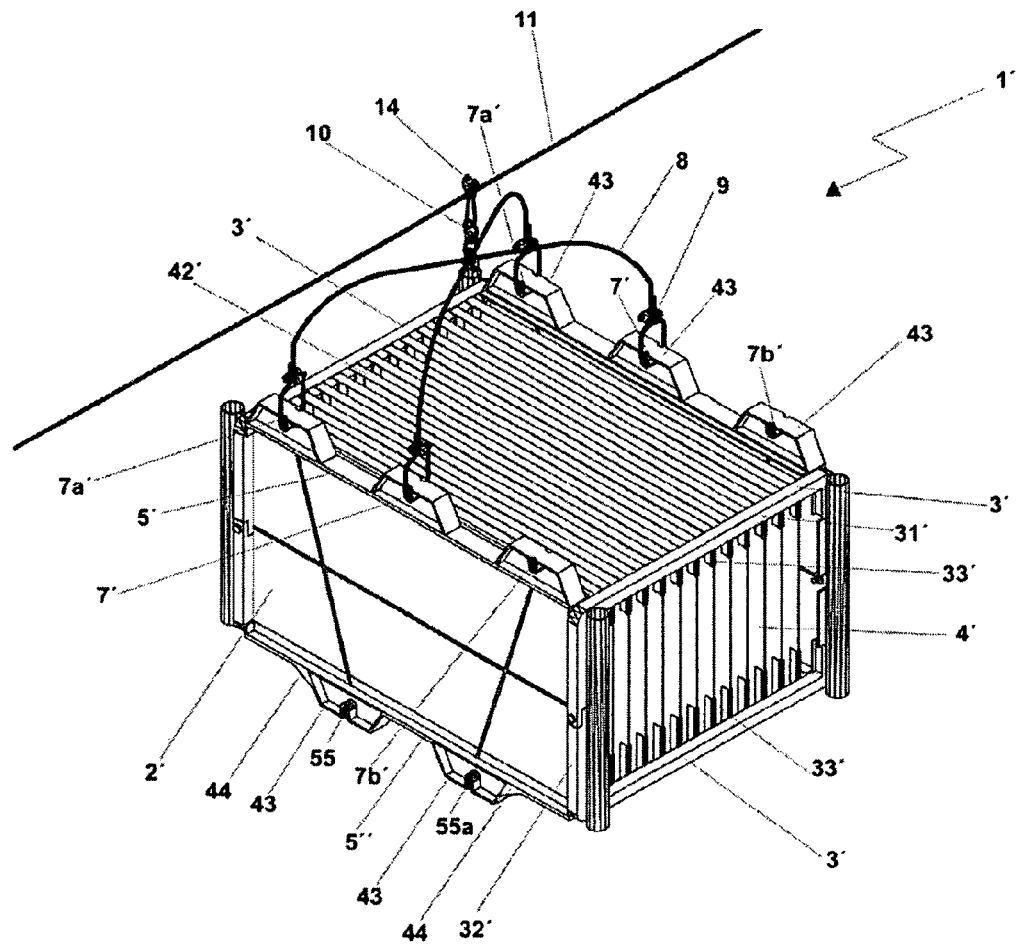
FIG. 13 shows a top perspective view of the device of the present invention in a second preferred embodiment, without the lid and lateral mesh covers.
Figure 14:
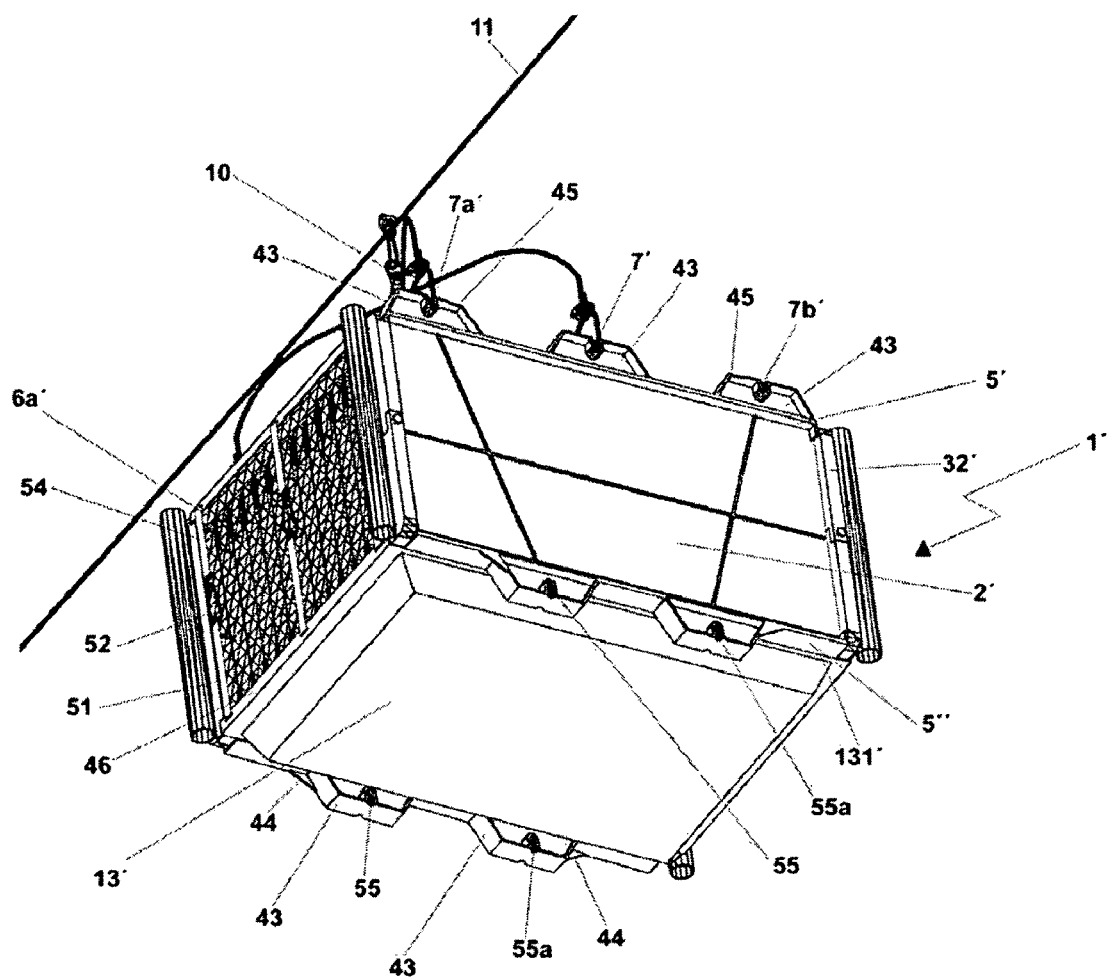
FIG. 14 shows a bottom perspective view of the device of the present invention in a second preferred embodiment, with the lid, lateral mesh covers and tray.
Figure 15:
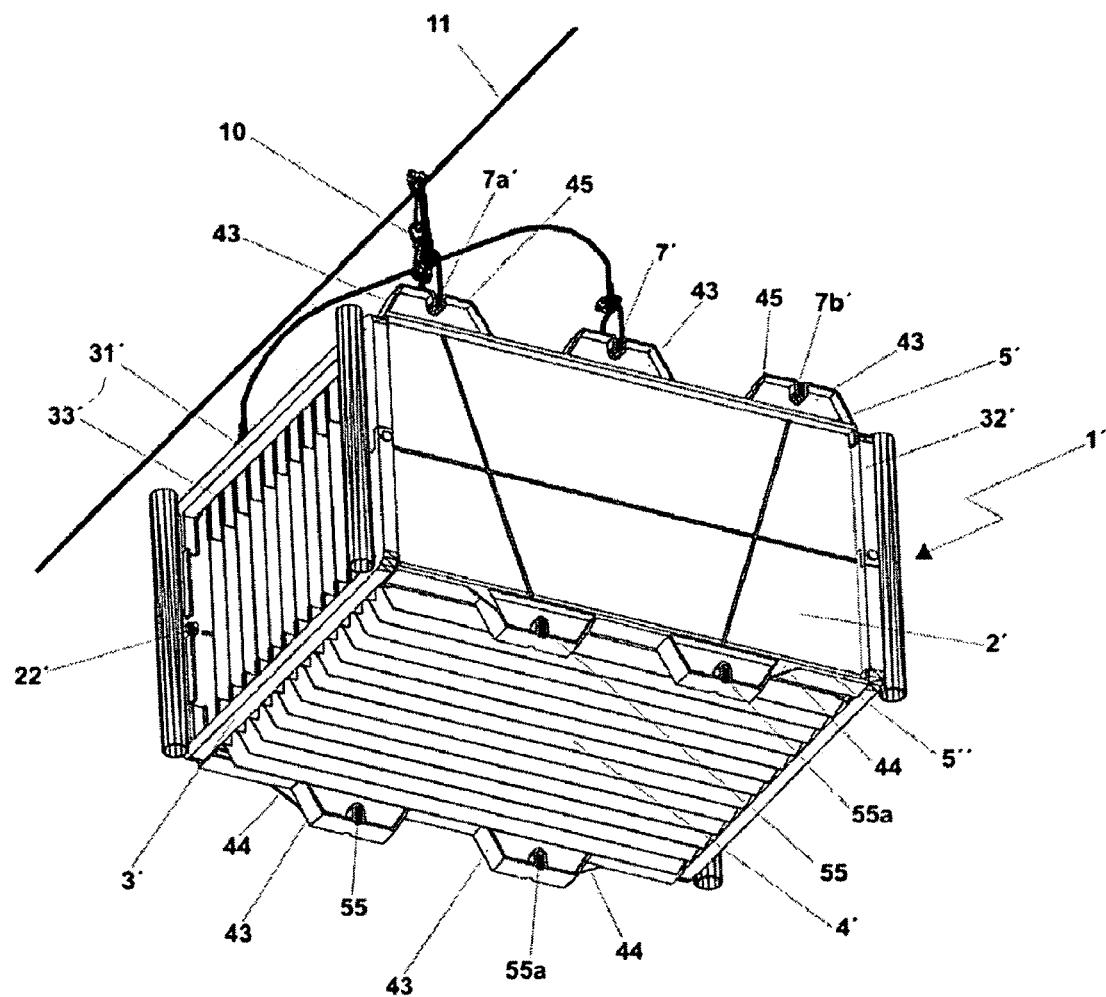
FIG. 15 shows a bottom perspective view of the device of the present invention in a second preferred embodiment, without the lid, lateral mesh covers and tray.
Figure 16:
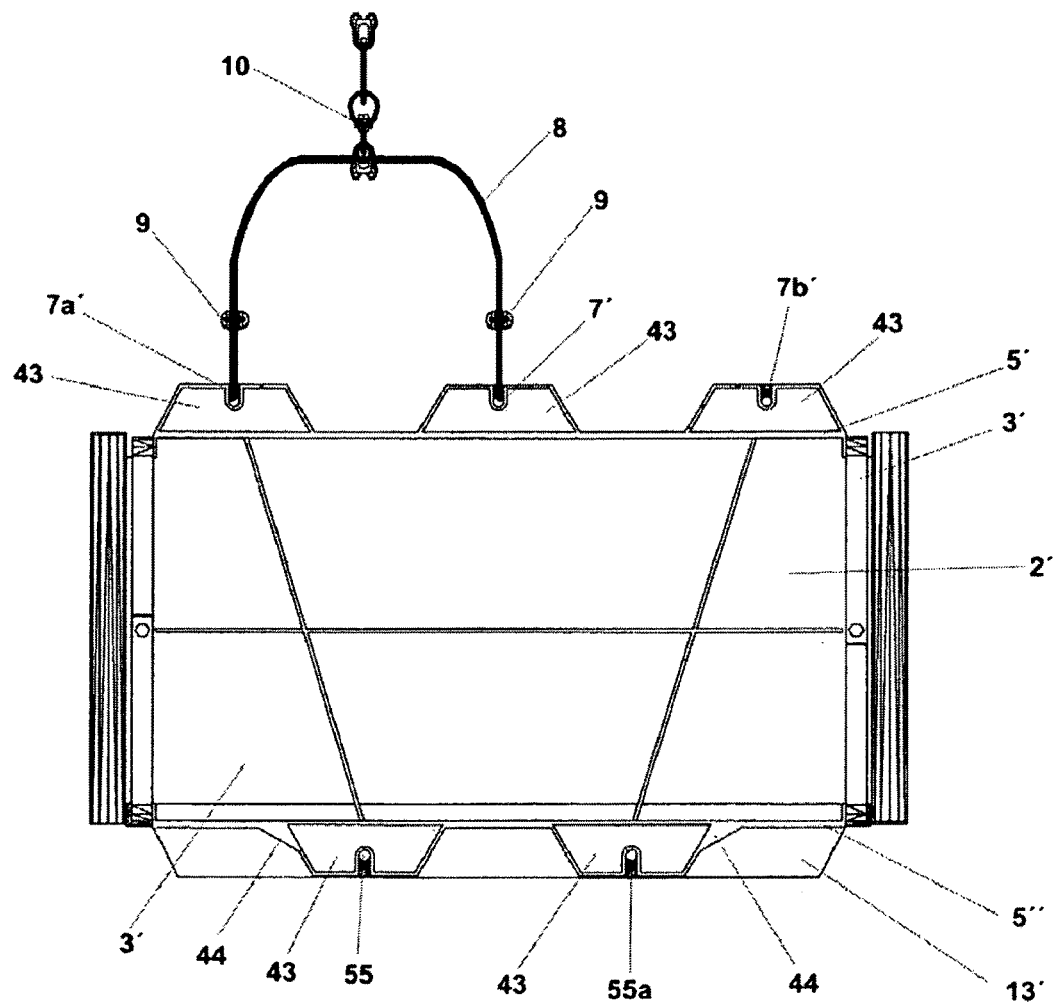
FIG. 16 shows a side view of the device of FIG. 12.
Figure 17A:
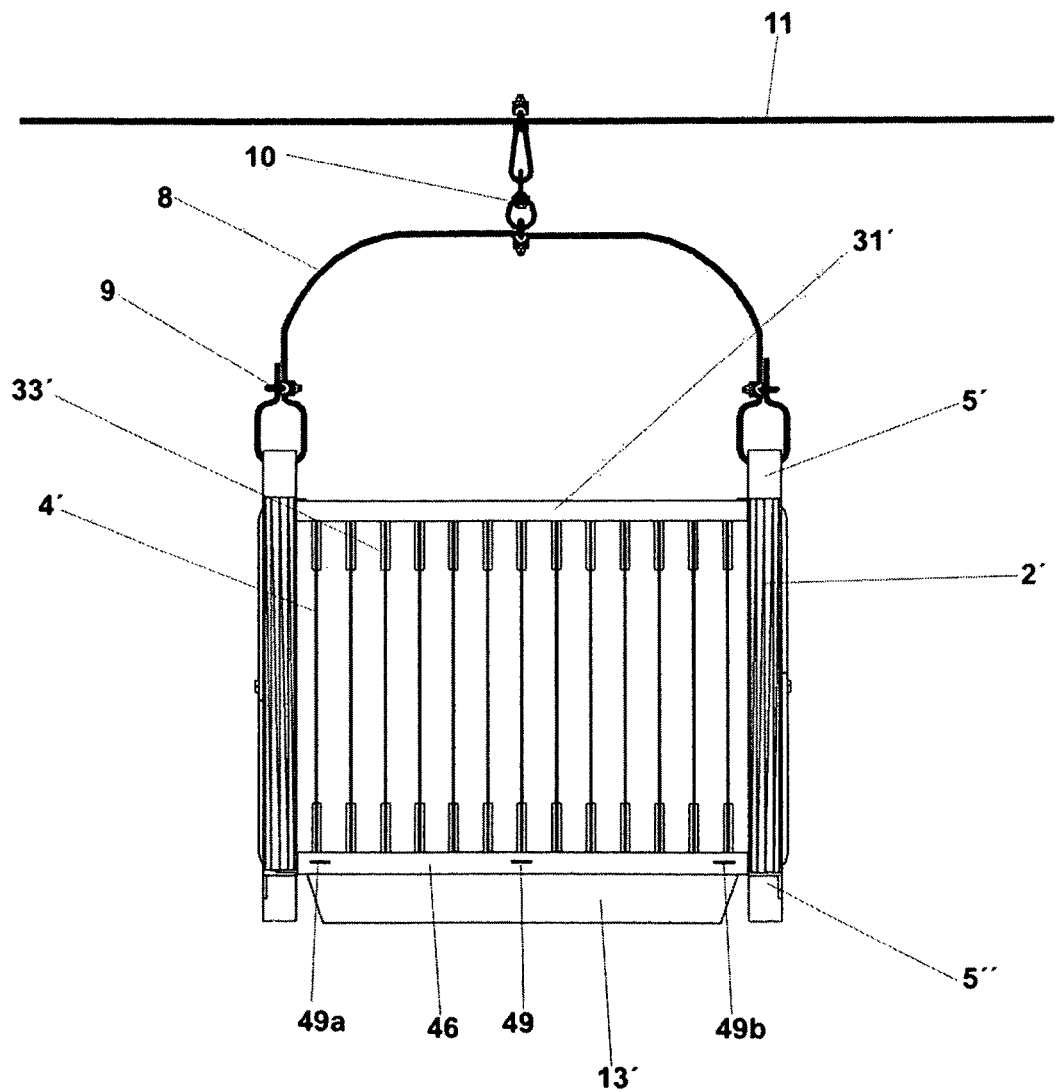
FIG. 17a shows a front view of the device of FIG. 12, with all of its plates installed.
Figure 17B:
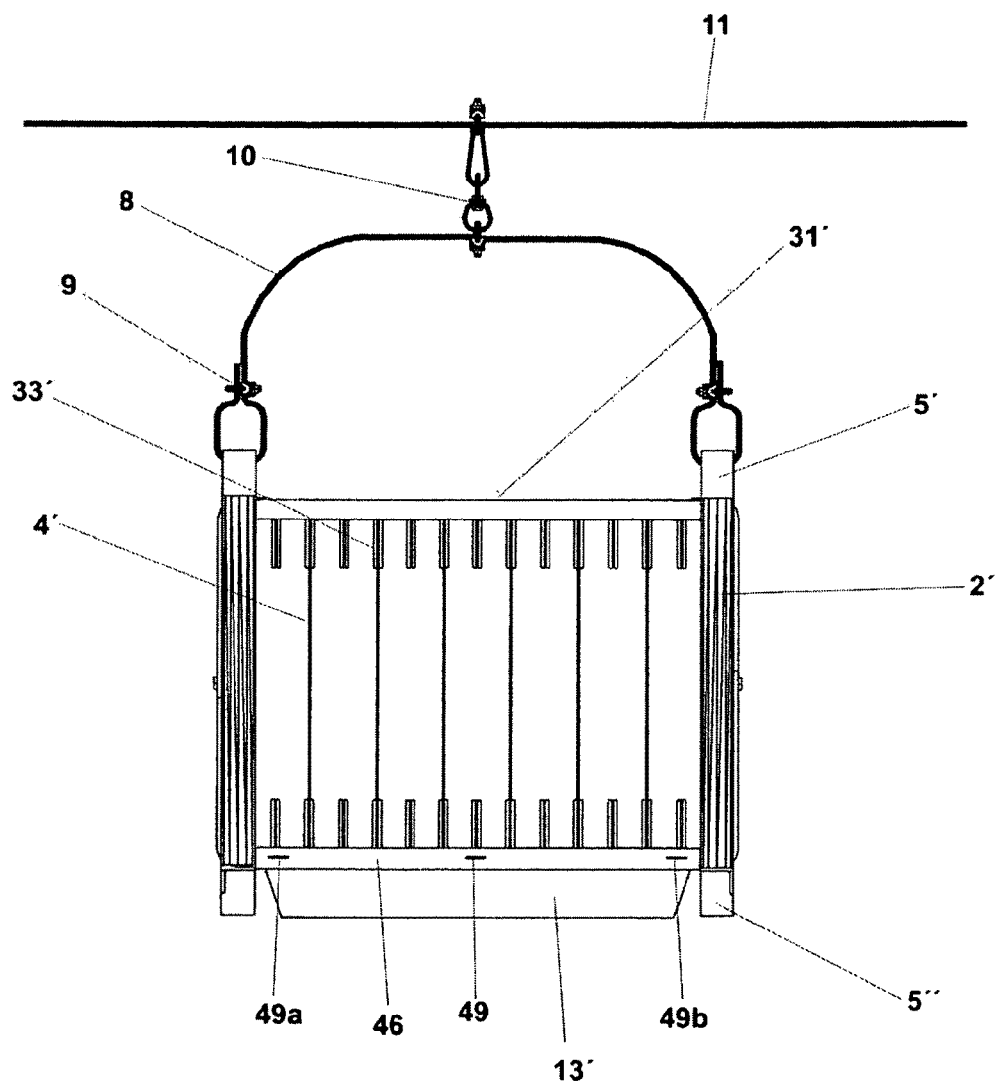
FIG. 17b shows a front view of the device of FIG. 12, with plates installed in every other guide (only alternate guides utilized).
Figure 18:
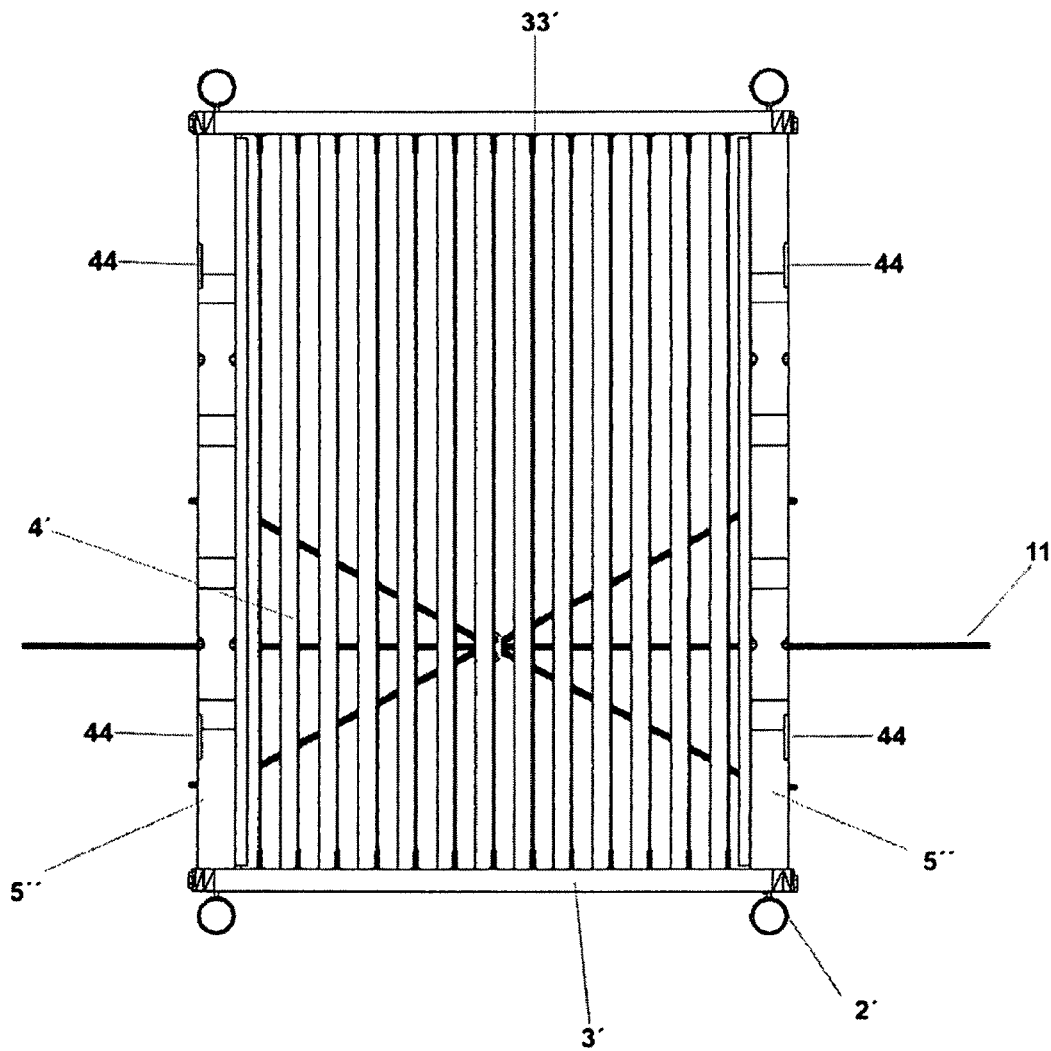
FIG. 18 shows a bottom view of the device in FIG. 12, as it is installed for uses without the tray and lid.
Figure 19:
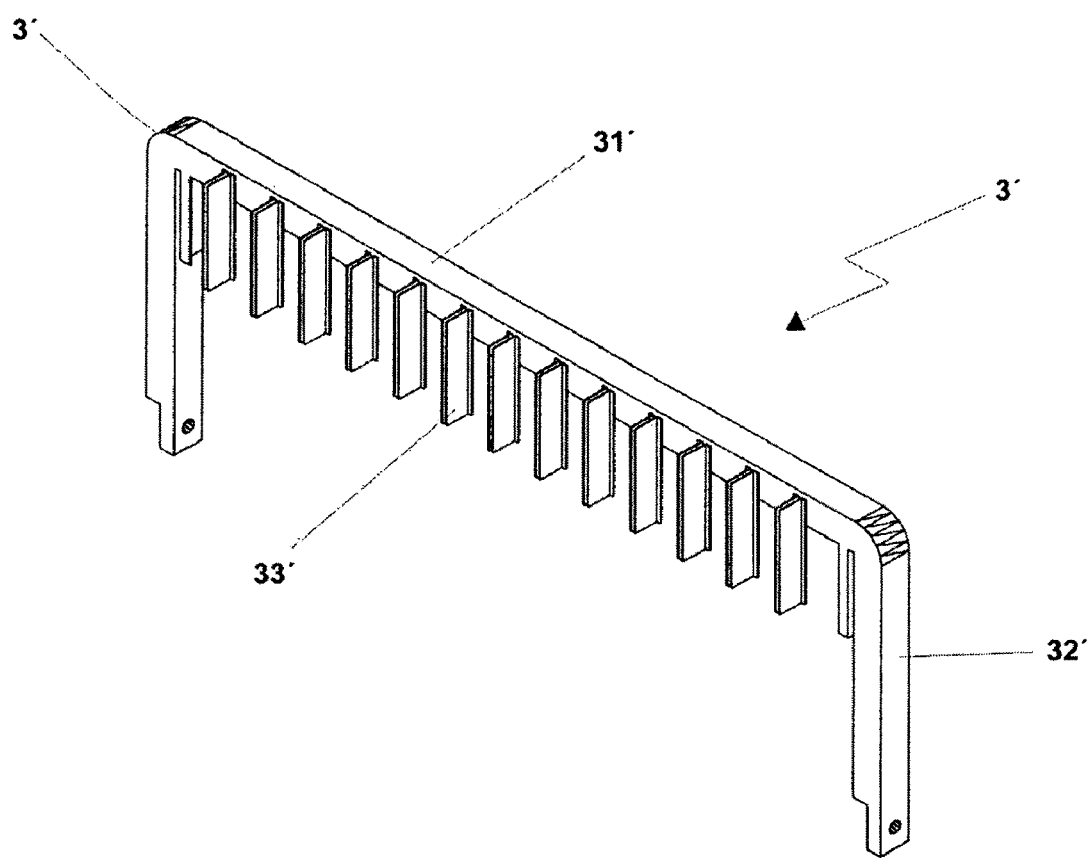
FIG. 19 shows a perspective view of a brace of the device shown in FIG. 12.
Figure 20A:
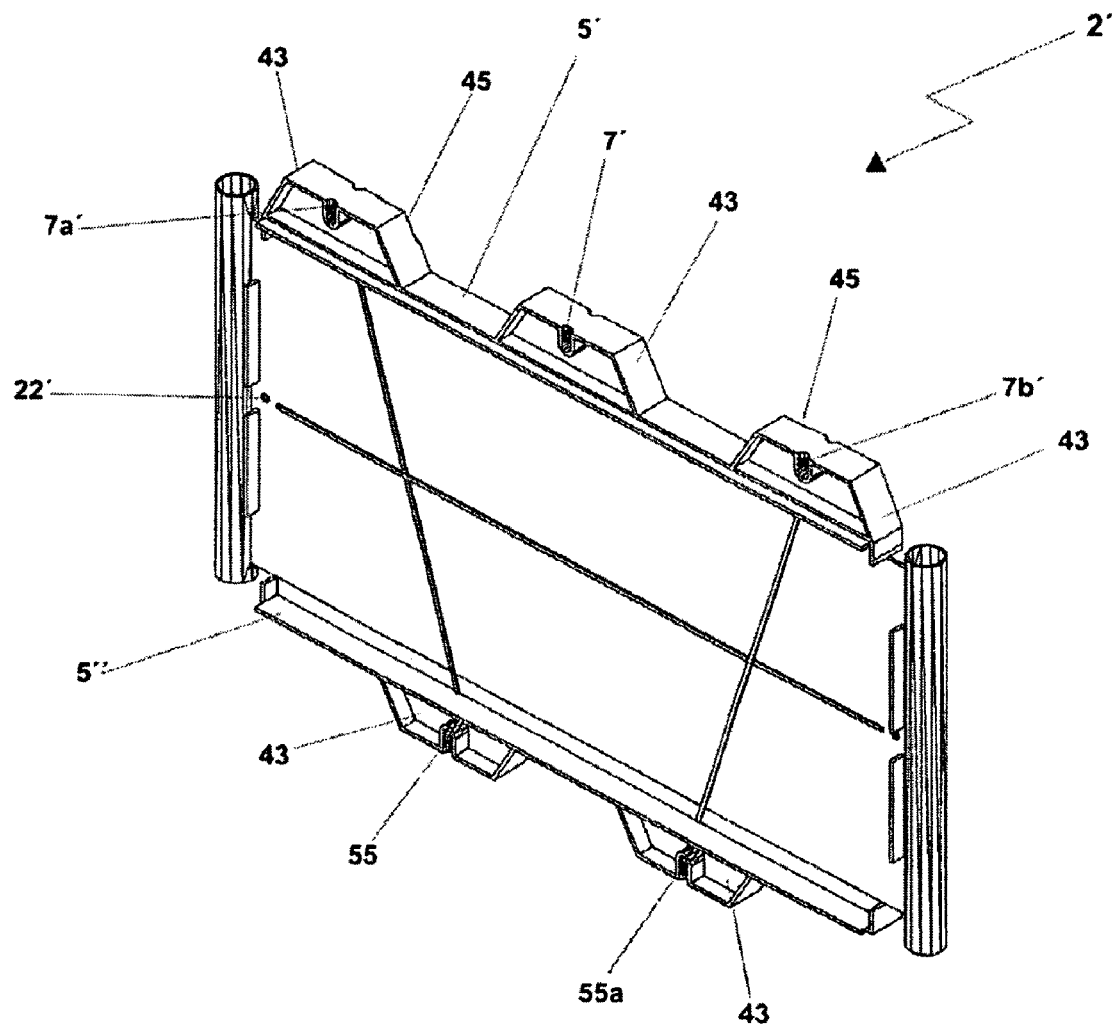
FIG. 20a shows a perspective view of the interior face of the rectangular lateral element of the device in FIG. 12
Figure 20B:
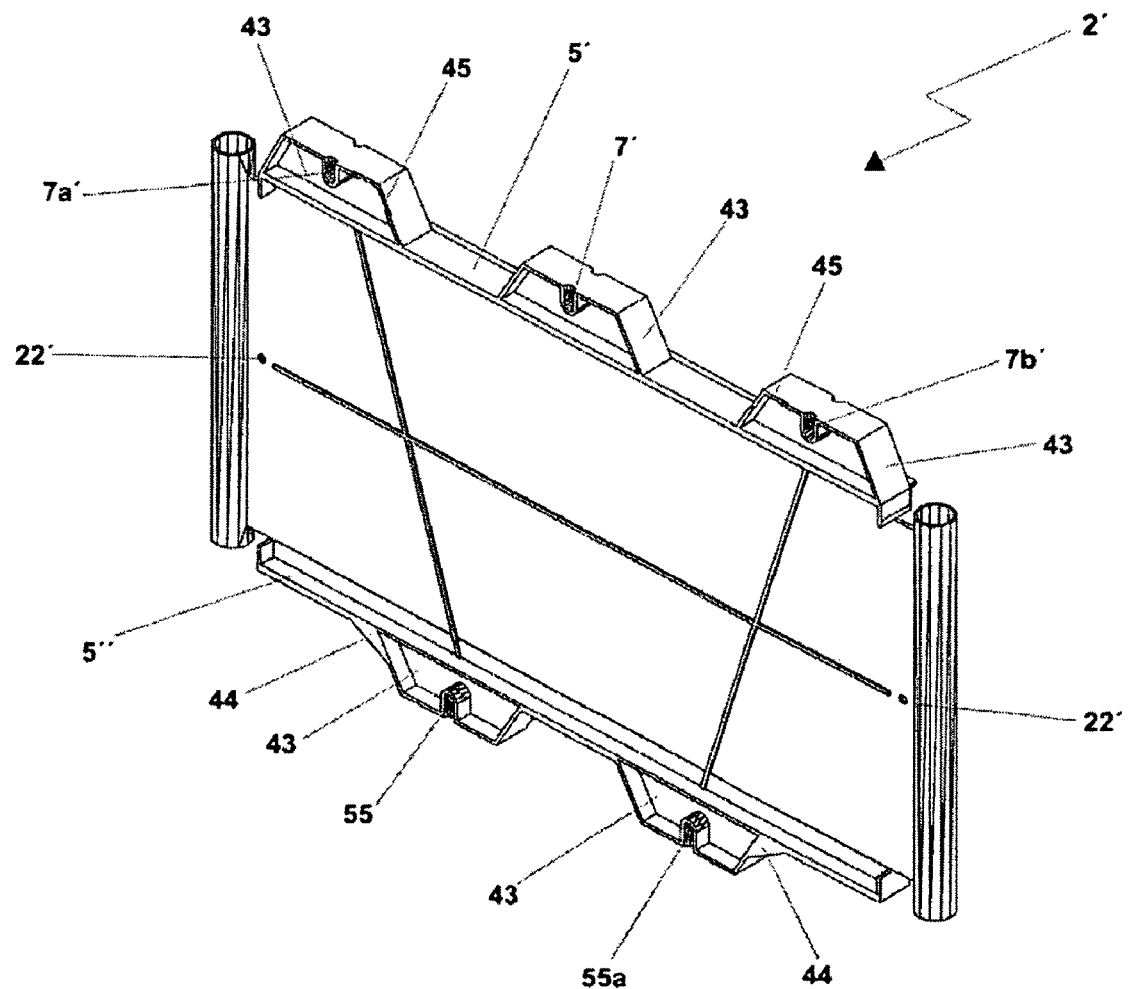
FIG. 20b shows a perspective view of the exterior face of the rectangular lateral element of the device in FIG. 12.
Figure 21:
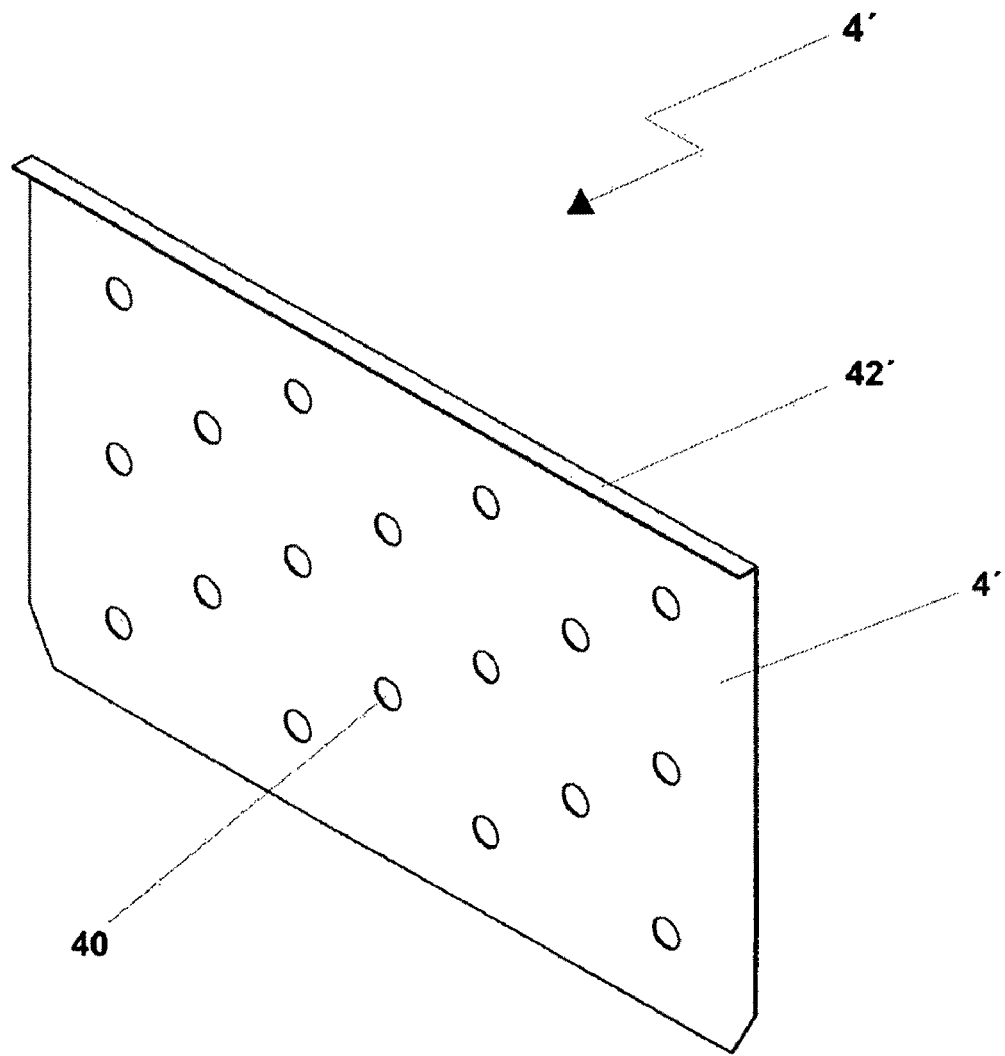
FIG. 21 shows a perspective view of a plate of the device shown in FIG. 12.
Figure 22:
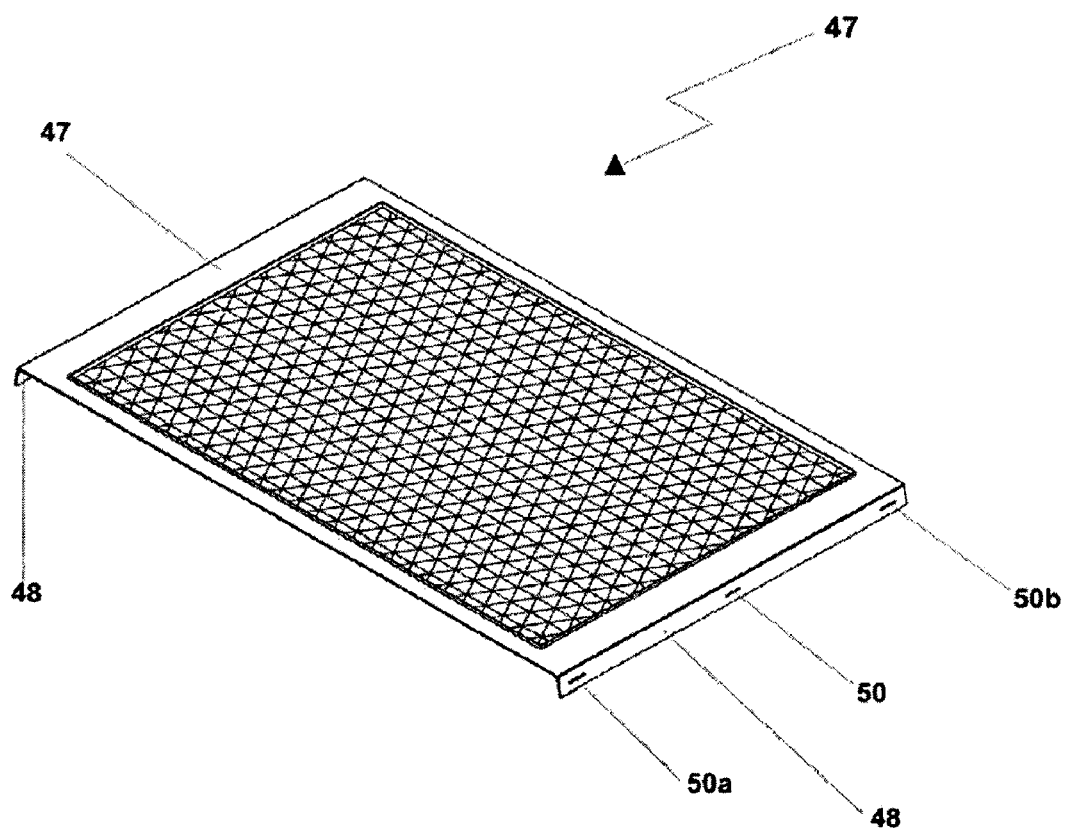
FIG. 22 shows a perspective view of the lid of the device shown in FIG. 12.
Figure 23:
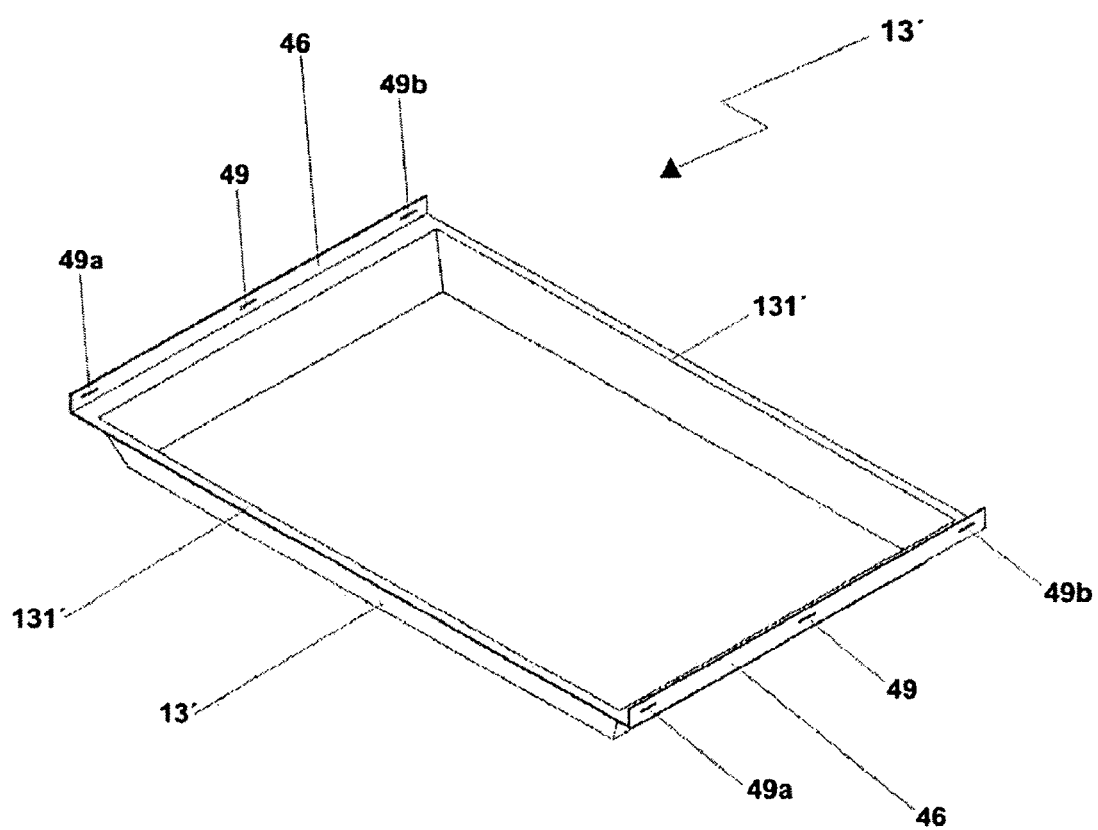
FIG. 23 shows a perspective view of the tray of the device shown in FIG. 12.
Figure 24:
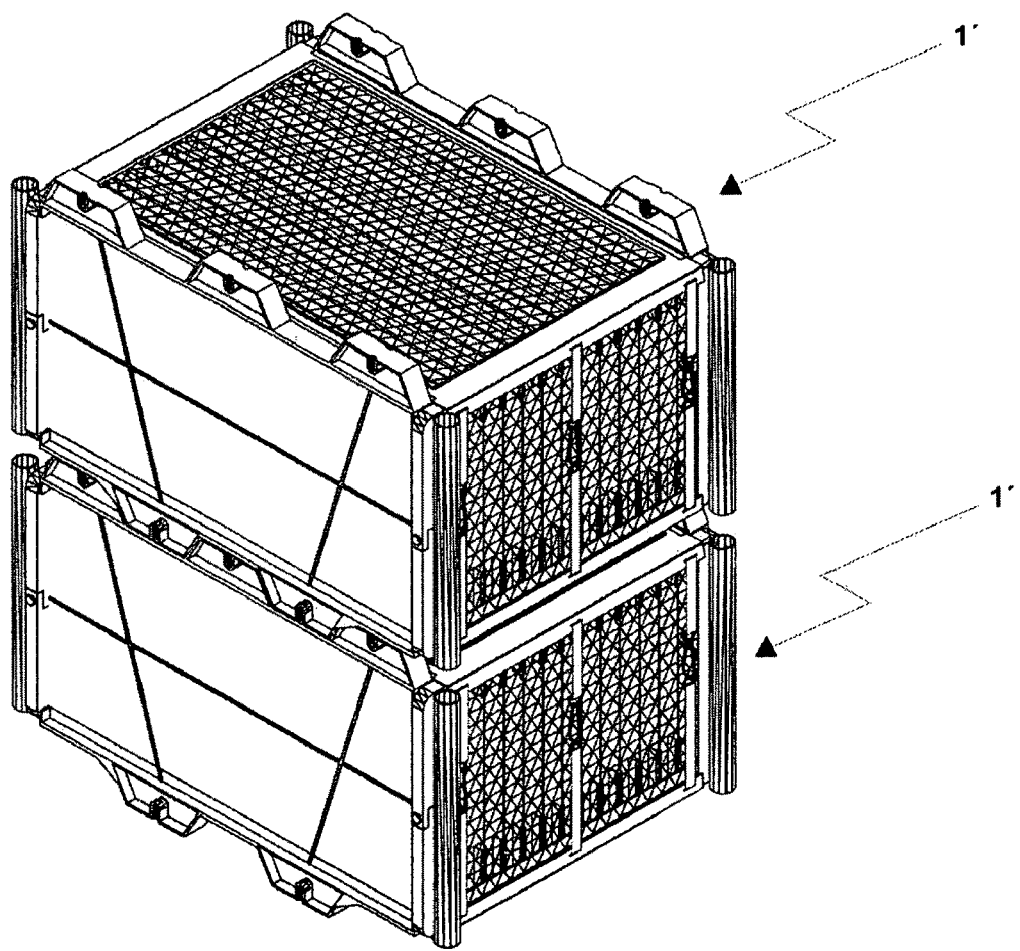
FIG. 24 shows two devices of the second preferred embodiment of the present invention, which are stacked one upon the other.

As shown in FIG. 1, FIG. 2 and FIG. 9, in a first preferred embodiment, the device (1) of the present invention is composed of two lateral elements (2), which are buoyant and of rounded shape, henceforth called lateral buoyant elements, and which are parallelly oriented in the longitudinal direction. In each of their extremes, the lateral buoyant elements have a groove (21) and a hole (22) for the installation of braces (3) that permit the lateral buoyant elements to be joined, leaving a separation between such lateral buoyant elements (2). These braces (3) have a curved area (32) at their ends and a straight area (31) in their center, such that upon joining the ends of two such braces with the inward-curving parts facing each other, in such a way that one brace is positioned above and the other below, their perimeter follows and encloses the exterior contours of the lateral buoyant elements (2).

In the straight area (31) of the braces (3), on the interior-facing surfaces, there is a plurality of guides (33) which are equidistantly and parallelly distributed, for the insertion of a plurality of plates (4). This plurality of plates (4) is vertically inserted, one at a time, into the guides (33), forming spaces between the plates (4) that accommodate sea urchins or abalones on both faces of the plates (4). Each plate (4) has at its base two holes (41) through which a plate retention pin (12) is inserted to attach them to the lower braces (3). Each plate (4) has a flange (42) at the top that provides shade to the culture, and serves as a stop or barrier so the plate (4) does not continue sliding down the guides (33), thereby additionally permitting the plate to be retained (4) at this point.

Each lateral buoyant element (2) has a lower longitudinal fin (5) that does not extend to the ends of the lateral buoyant element, wherein such fin has three equidistant holes (7, 7a, 7b), including a central hole (7) and two holes (7a, 7b) at its ends, which permit attaching the anchorage to a "mother line" (11). Only two holes are used in the anchorage, the central perforation (7) and a first end hole (7a), while the second end hole (7b) remains free. In this manner an off-centered anchorage axis is formed, permitting the device (1) to act as an "underwater weathervane", in other words, allowing it to turn to face the current and thus offering a constant exchange of interior and exterior water (with benefits of greater oxygenation and cleaning) and greater protection of the cultivated organisms by offering less resistance to the sea.

A tray (13) is located on the base of the device (1) of the present invention, such tray being positioned below the plates, at one end of the lateral buoyant elements (2) and extending approximately half of their length. This tray (13) is used to deposit algae (or other types of feed) for the feeding of sea urchin that have a diameter greater than 1.5 cm The tray does not have front or rear walls, only side walls (131) which support it via attachment to the base of the lateral buoyant elements (2), and furthermore, the tray has an opening (132) in its base that permits effective cleaning by the marine current.

The front end of the tray (13) is located at approximately the mid-point of the length of the plates (4), while the back end extends to the end of the plates (4), where it is connected to them by a plate retention pin (12), such plates (4) being supported by the guides (33) of the braces (3).

As such, all the previously described components are located in the space between the lateral buoyant elements (2), in which a net or mesh (6) is distributed throughout the width of the separation of the lateral buoyant elements (2), wherein one end of the mesh (6) is attached to the ends of the lateral walls of the tray (13) forming front and back mesh walls and also covering the opening (132) in the base of the tray (13), additionally wherein such mesh is distributed so that the length of the mesh encloses the plurality of plates (4) in the longitudinal axis of the lateral buoyant elements (2). This mesh (6) is preferably Netlon® (plastic thread), while the size of the gaps in the mesh (6) should be smaller than the size of the organisms being cultivated; in the case of sea urchins, a gap of less than or equal to 4 mm should be used so the sea urchins cannot pass through the mesh. In both edges of the longer sides of the mesh (6) a rope is passed through, such rope whose ends protrude by approximately 10 cm in order to be tied. In the shorter sides of the mesh (6) a joining method, preferably of the hook-and-loop or Velcro® type, is installed to close it. Once the mesh (6) is secured to the tray (13) by the plate retention pin (12), the free part of the mesh (6) is installed by wrapping the edges of the plates (4) that are visible between both lateral buoyant elements (2) and joining the ends using the rope ends and Velcro®. The use of Velcro® allows opening and closing the mesh to introduce algae into the tray for the purpose of feeding the sea urchins or abalones.

In this way, the larvae of sea urchins or abalones will affix themselves to the plurality of plates (4), where they will metamorphose into sea urchin or abalone seeds. In the case of sea urchins, once they reach a diameter of 1.5 cm, they will change feeding habits and proceed to detach themselves from the plates in search of algae. As such, the mesh (6) protects the sea urchins or abalones from being carried away by the sea current once they detach themselves to look for algae. The algae should be supplied in the tray (13), and should be changed as necessary.

Upon harvesting the sea urchins or abalones that are attached to the plates (4), one proceeds to reinstall the plates (4) in the same device as before, except using every other guide (33) in the braces (3), thereby increasing the interior space in order to allow the sea urchins or abalones to grow larger.

As the sea urchins or abalones grow, the plates are repositioned in the guides (33) of the braces (3) to create more interior space. This can be performed without the need to detach the sea urchins or abalones from the plates. One proceeds in this way until the sea urchins or abalones reach the desired commercial size. As the plates (4) are repositioned, it becomes necessary to have space for their repositioning, for which a new structure of the device (1) of the present invention is built, forming a higher capacity culture system composed of a plurality of devices (1) which are located in close proximity to each other.

Therefore one can use braces (3) of different colors for the classification of the devices (1) according to the size of the sea urchins or abalones contained in their plates (4).

To assemble the device (1), first 4 braces (3) are installed around the circumference of the lateral buoyant elements (2), with the guides (33) oriented towards the interior space that is formed between both lateral buoyant elements (2), and they are attached to the lateral buoyant element with a bolt that passes through the holes (22), and is secured with a nut. Subsequently the anchorage (8, 9 and 10) should be installed, followed by the insertion of the plurality of plates (4) into the guides (33) of the braces (3) on the side opposite from the anchorage, such plates which are affixed using the plate retention pins (12). Once the plurality of plates (4) are installed, one proceeds to attach the tray (13), to which the mesh (6) has already been affixed, to the plate retention pin (12) which is located close to the free hole (7*b*) at the back of the device. Finally, one must wrap the ends of the plurality of plates (4) in the mesh (6) and close it with the joining method, which is preferably Velcro®.

However, for the use of this device (1) in the sea, assembly is recommended only to the point of installing the plurality of plates (4), without attaching the tray (13) and mesh (6). The partially assembled device (1) should be submerged in the sea, using a weight, for a conditioning time period that allows microalgae to become affixed to the plurality of plates (4), such microalgae which will be food for the future sea urchin and abalone seeds. Having completed this conditioning time period, and during the reproduction period of sea urchins or abalones, one should position and attach the tray (13), wrap the device (1) with the mesh (6) and install it in a long-line system, that is, in a system composed of systems of floats, anchors and "mother lines" arranged in a water depth of 5 to 7 meters according to previous studies.

As shown in FIG. 12, FIG. 13, FIGS. 20*a* and 20*b*, in a second preferred embodiment, the device (1') of the present invention is basically composed of two flat and rectangular lateral elements (2'), henceforth called rectangular lateral elements, which are longitudinally parallel to each other. Each one of their ends has a groove (21') and a hole (22') for the insertion of some braces (3') which allow them to be joined, leaving a separation between such rectangular lateral elements (2'). These U-shaped braces (3') composed of straight sides have a center area (31') and two arms (32'), such that, upon joining two braces at their ends and facing each other such that there is one top brace and one bottom brace, they surround the exterior perimeter of the rectangular lateral elements (2'). The rectangular lateral elements in this second embodiment not buoyant.

In the center area (31') of the braces (3'), on their interior surfaces, there is a plurality of guides (33') which are equidistantly and parallelly spaced, to accommodate a plurality of plates (4'). This plurality of plates (4') is inserted vertically, one at a time, into the guides (33'), creating spaces between the plates (4') that permit housing sea urchins or abalones on both faces of the plates (4'). Each plate (4') has at its top a flange (42') that provides shade to the culture, and that additionally serves as a stop or barrier so the plate (4') does not continue sliding down the guides (33') and to retain the plate (4') at this point. Depending upon the organism to be cultivated (sea urchin or abalone), each plate (4') can have a certain quantity of holes (40) that are separated by certain distances, such holes which permit the organism to move from one face to another of the same plate (4'). In this way, in the case of abalone, the organism can move to the side of the plate which has more shade.

Each rectangular lateral element (2') has a top (5') and bottom notched fin (5"), which does not extend to the ends of the rectangular lateral element thereby leaving the ends free. The top notched fin (5') has 3 equidistant holes (7', 7*a*', 7*b*'), consisting of one center hole (7') and two end holes (7*a*', 7*b*'), for the purpose of attaching the anchorage to a "mother line" (11). In this anchorage, only two holes are used, the center hole (7') and a first end hole (7*a*'), while the second end hole (7*b*') remains free. In this manner an off-centered anchorage axis is formed, permitting the device (1') to act as an "underwater weathervane", in other words, allowing it to turn to face the current with its front, thus offering a constant exchange of interior and exterior water (with benefits of greater oxygenation and cleaning) and greater protection of the cultivated organisms by offering less resistance to the sea. The bottom notched fin (5") has two equidistant holes (55 and 55*a*) that expand the anchorage options, such as, for example, coupling a second device (1') to the first one.

As shown in FIGS. 18, 20*a*, 20*b*, and 24, the teeth (43) of the top and bottom notched fins (5' and 5") are designed to be interlocking such that, out of the water, one can securely stack one device (1') on top of another, whether for storage or transportation purposes. On the teeth (43) of the bottom notched fin (5") there are also some flanges (44) that fit into some grooves (45) in the teeth (43) of the top notched fin (5'), limiting the transverse movement of the stacked devices (1').

Figure 25:
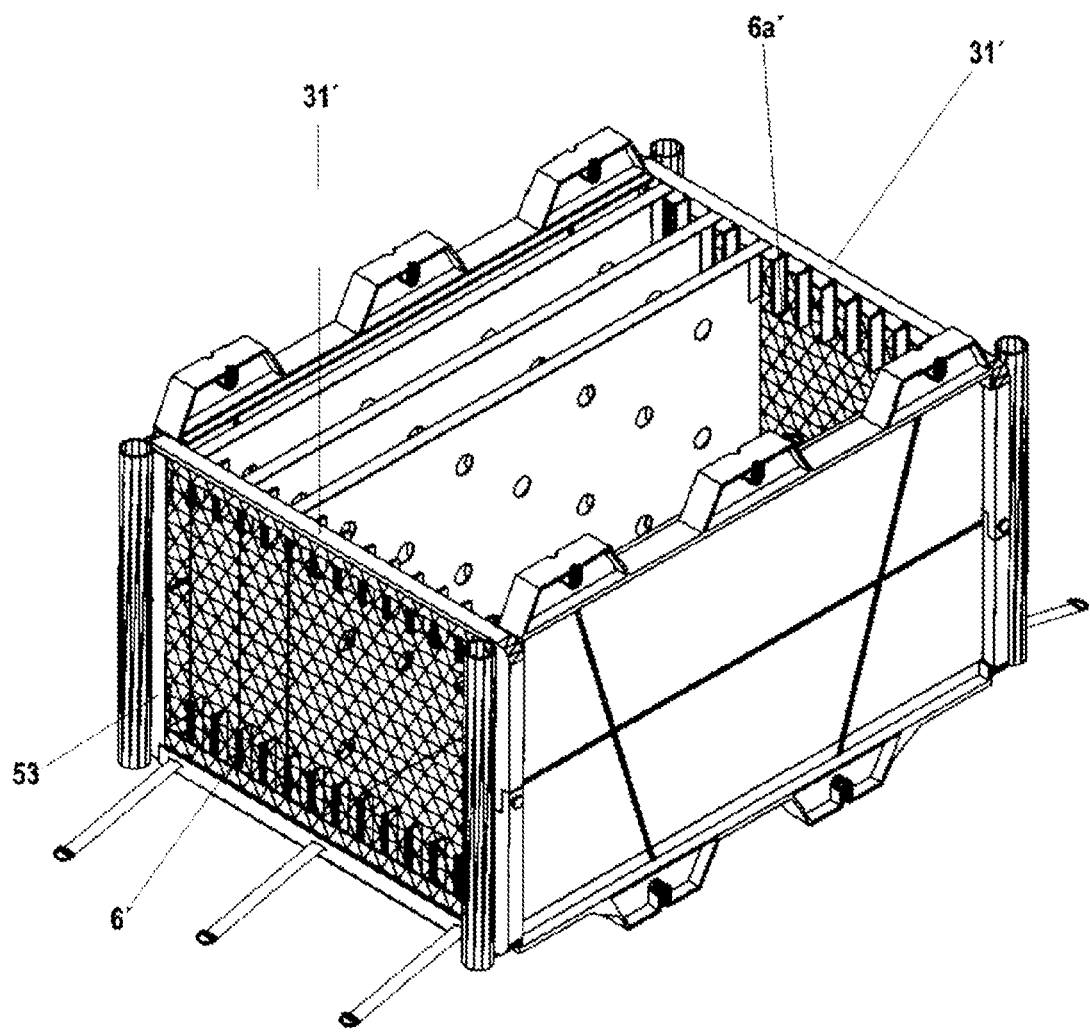
FIG. 25 shows a top perspective view of the device of FIG. 12, with the top lateral mesh removed and three plates installed.

As shown in FIG. 25, the nets or lateral mesh (6' and 6*a*') are located on the front and back ends of the assembly that is composed of the braces (3') and the plates (4'), such nets or lateral mesh preferably composed of rigid mesh in which the size of the openings should be smaller than the size of the cultivated organisms. The nets or lateral mesh cover, in one direction, from the upper to the lower brace (3'), and in the other direction, from one internal face of the rectangular lateral element (2') to the other.

On the sides of each mesh cover (6' and 6*a*') a flat and rigid strip (53) is sewn, such strip additionally being inserted into the space formed by the end of the rectangular lateral element (2') and the center part (31') of the top and bottom brace (3'). The top and bottom parts of the mesh covers (6' and 6*a*') are attached to the center part (31') of the brace (3') on its exterior face, preferably using plastic seals, cable ties or the like.

On the base of the device (1') of the present invention, a tray (13') is located below the plates, such tray which covers the length from one lower brace (3') to the other and from one rectangular lateral element (2') to the other. This tray (13') is used to deposit algae or pellets to feed the abalone. The tray has front, back and lateral walls (131'), the latter of which are affixed to the lower edges of the rectangular lateral elements (2').

On the front and back ends of the tray (13') there is a flange (46) that covers the lower face of the lower braces (3') and slopes slightly upwards towards their exterior face, covering the lateral mesh covers (6' and 6a'). Each flange (46) has three rectangular holes (49, 49a and 49b). A strap (51) is passed through each hole and sewn, so as to secure the tray (13') on one end of the strap, and the male part of the closing mechanism (52) on the other end.

The lid (47), which has an opening at its base where a net is attached by sewing, is located on the top of the device (1') of the present invention, above the plates (4'), and it covers the length from one top brace (3') to the other, and from one rectangular lateral element (2') to the other. It has on its front and back ends, a flange (48) which covers the top face of the top braces (3') and slopes slightly downwards towards the exterior face of the braces, covering the lateral mesh covers (6' and 6a'). Both flanges (48) have three rectangular holes (50, 50a and 50b). A strap (54) is passed through each hole and sewn so as to secure the lid (47) on one end of the strap, and the female closing mechanism (52) on the other end.

Upon connecting together the male and female ends of the closing mechanism (52), the lid (47) and the tray (13') are affixed to the device (1'), such that together with the lateral mesh covers (6' and 6a'), the plates (4') are enclosed within, thereby preventing the escape of the cultivated organisms.

In this manner, the larvae of sea urchins or abalones will attach themselves to the plurality of plates (4'), where they will metamorphose into sea urchin or abalone seeds. Upon reaching a certain size, the seeds will change their feeding habits and should begin to feed upon the algae or pellets provided in the tray (13'). The algae should be changed as necessary.

Upon harvesting the sea urchins or abalones that are attached to the plates (4'), one proceeds to reinstall the plates (4') in the same device as before, except using every other guide (33') in the braces (3'), thereby increasing the space between the plates in order to allow the sea urchins or abalones to grow larger and facilitate operator access to the culture.

As the sea urchins or abalones grow, the plates are repositioned in the guides (33') of the braces (3'), to create more interior space. This can be performed without the need to detach the sea urchins or abalones from the plates. One proceeds in this way until the sea urchins or abalones reach the desired commercial size. As the plates (4') are repositioned, it becomes necessary to have space for their repositioning, for which a new structure of the device (1') of the present invention is built, forming a higher capacity culture system composed of a plurality of devices (1') which are located in close proximity to each other.

Therefore one can use braces (3') of different colors for the classification of the devices (1'), according to the size of the sea urchins or abalones contained in their plates (4').

To assemble the device (1'), first 4 braces (3') are installed in the guides (21') of the rectangular lateral elements (2'), with the guides (33') facing the interior space that is formed between both rectangular lateral elements (2'), and they are attached to an external float with a bolt that passes through the holes (22') and is secured with a nut. Subsequently the anchorage (8', 9' and 10') should be installed, followed by the installation of the plurality of plates (4') into the guides (33') of the braces (3') on the side opposite from the anchorage. Once the plurality of plates (4') is installed, one proceeds to install the lateral mesh covers (6' and 6a') and attach them to the braces (3') preferably with a plastic seal, cable tie or the like. Next the tray (13') and finally the lid (47) are installed, fastening the closing mechanisms (52) of the lid and tray, and adjusting the tension of the straps (54).

In the case of use for seed capture, in this second preferred embodiment, the device (1') is completely assembled for conditioning in the sea, and is installed in a long-line system, or in other words, installed in a system composed of systems of floats, anchors and "mother lines", distributed in a water depth of 5 to 7 meters according to previous studies.

Example of the First Preferred Embodiment

To assemble a device (1) of the present invention, two lateral buoyant elements (2) with a rounded shape are provided, and such lateral buoyant elements preferably have dimensions of 109 cm×40 cm×12.5 cm, are yellow or another color that will be easily visible in the sea, are manufactured of polyethylene (PE) material using rotational molding (rotomolding) and are injected in their interior with expanded polystyrene (EPS). Also 4 identical braces (3) are provided, such braces being manufactured of polypropylene by injection molding and having dimensions of 61 cm×16 cm×4.5 cm. The aforementioned braces (3) each have 10 guides (33), spaced 3 cm apart. The groove in the guides is 3 mm wide. The braces (3) are placed in the grooves (21) on the top and bottom of the lateral buoyant elements (2) and attached, as a pair, to the lateral buoyant element with a galvanized bolt that passes through the provided holes (22). The aforementioned components can be constructed in different eye-catching colors for underwater visibility, such as orange, yellow and lime green, for the purpose of classifying and differentiating the contained cultures. The plurality of plates (4) consists of 10 plates (4) constructed of fiberglass o thermoformed polyethylene (PE), whose dimensions are 80 cm in length×2 mm in thickness×32 cm of height. The material and structure of the plates determine the type of organism that will be attracted and captured, for example, if the plates are constructed of a frame supporting interior cords, net or mesh, they would be used to capture scallops, mussels or algae. Similarly, plates constructed of asbestos-cement would be used to capture scallops and *Megabalanus psittacus* (a barnacle-like crustacean belonging to the Cirripedia class).

The plates (4) are vertically inserted, with the flange (42) on top, into the guides (33) of the braces (3) located on both ends of the lateral buoyant elements (2). There is 3 cm of space between the plates, which permits housing sea urchins of up to 1.5 cm in diameter, or abalones, on both faces of the plate. Each plate has two holes (41) at its base through which plate retention pins (12) are inserted to attached it to the lower braces. The two plate retention pins (12) are constructed of galvanized wire with a diameter of 4 mm.

The tray (13) is made of fiberglass or thermoformed PE which is gray in color, such tray having dimensions of 44.5 cm×32 cm×3 mm thickness. One end of the tray is affixed by two snap hooks to the plate retention pin (12), such pin which is located at the same end of the device as the free holes (41) of the lateral buoyant elements (2). Each snap hook is installed in a hole (not shown) that is present in each back top edge of the tray.

The Netlon® mesh (6) has a length of 250 cm and a width of 36 cm. A polypropylene (PP) rope is passed through both long edges, such rope having a diameter of 5 mm and whose ends extend an extra 10 cm to be tied. Velcro® is sewn to the shorter sides of the mesh (6) to close it.

The device (1) is attached to the "mother line" (11) with an anchorage system composed of 2 braided cables with a diameter of about 8 mm (5/16"), 4 wire rope clips (9) of about 8 mm (5/16') thick galvanized steel, 1 wire rope clip (14) of 9.5 mm (3/8") thick galvanized steel, 1 swivel (10) of about 8 mm (5/16") thick galvanized steel, 1 shackle of about 9.5 mm (3/8")

thick galvanized steel and a snap hook of about 8 mm (5/16") thick galvanized steel. Each device (1) should be installed a minimum of 115 cm away from other devices to enable it to freely rotate.

Example of the Second Preferred Embodiment

To assemble a device (1') of the present invention, two flat rectangular lateral elements (2') are provided, such rectangular lateral elements will preferably have dimensions of 117 cm×73 cm×5 cm, be black in color, be manufactured of polyethylene (PE) material using rotational molding (rotomolding) and injected in their interior with expanded polystyrene (EPS), or alternatively be manufactured of reinforced plastic (such as glass-reinforced plastic). Also provided are 4 identical braces (3') preferably manufactured by injection molding of polypropylene or ABS, or made of stainless steel, such braces preferably with dimensions of 79.3 cm×30.6 cm×4.5 cm if made of injected plastic, or 79.3 cm×30.6 cm×3 cm if made of stainless steel. Each brace has 13 guides (33'), with a space of 5 cm between adjacent guides. The guides have a 3 mm-wide groove. The braces are placed in the grooves (21') on the top and bottom of the rectangular lateral elements (2') and are attached, as a pair, with the rectangular lateral element using a bolt which passes through the provided holes (22') and is preferably of stainless steel material. The aforementioned components can be constructed of different eye-catching colors for underwater visibility, such as orange, yellow and lime green, for the purpose of classifying and differentiating the contained cultures. The plurality of plates (4') consists of 13 plates (4') which are black in color and constructed fiberglass or thermoformed polyethylene (PE), such plates whose dimensions are 99 cm in length×2 mm thickness×60.5 cm in height. The material and structure of the plates determine the type of organism that will be attracted and captured, for example if the plates are constructed of a frame supporting interior cords, net or mesh, they would be used to capture scallops, mussels, or algae. Similarly, asbestos-cement plates would be used to capture scallops and *Megabalanus psittacus* (a barnacle-like crustacean belonging to the Cirripedia class).

The plates (4') are vertically inserted, with the flange (42') on top, into the guides (33') of the braces (3') located at both ends of the rectangular lateral elements (2'). The space provided between the plates is 5 cm wide and permits housing sea urchins and abalones on both faces of the plates. To allow the abalones to move from one face to the other, the plate (4') preferably has 18 holes (40) each of about 3.5 cm in diameter, distributed equidistantly apart over the entire surface area, distributed in an interlayered pattern.

The lateral mesh covers (6' and 6a'), with dimensions of 72 cm×56 cm, are constructed of rigid plastic mesh preferably of a dark color, and their side edges have black-colored fiberglass or polyethylene pulls, such pulls having dimensions of 56 cm×3 cm×2 mm thickness and which are sewn to the mesh. The mesh covers are preferably attached with a plastic seal, cable tie or the like, to the straight center part (32') of the braces (3') on the exterior face.

The tray (13'), which is black in color, is made of fiberglass or thermoformed PE and has dimensions of 117.7 cm×67.7 cm×7.8 cm and 3 mm thickness. The lid (47) has dimensions of 117.7 cm×67.7 cm×3.8 cm and 3 mm thickness, and is made of black-colored fiberglass or thermoformed PE, with dark-colored rigid mesh of dimensions 93 cm×61.5 cm sewn into the opening in its base.

Each end of the tray (13') is attached to the corresponding end of the lid (47) using closing mechanisms (52), which are preferably of plastic or stainless steel and are sewn to an end of the straps (54 and 51) which are sewn to the corresponding end of the tray (13') and lid (47). Next the straps (54) are tightened.

The device (1') is attached to a "mother line" (11') with an anchorage system composed of 2 braided PP cables with a diameter of about 8 mm (5/16"), 4 wire rope clips (9') of about 8 mm (5/16") thick galvanized steel, 1 wire rope clip (14') of about 9.5 mm (3/8") thick galvanized steel, 1 swivel (10') of about 8 mm (5/16") thick galvanized steel, one shackle of 9.5 mm (3/8") thick galvanized steel and a snap hook of about 8 mm (5/16') thick galvanized steel. Each device (1') should be installed a minimum of 125 cm away from other devices to enable it to freely rotate.

The invention claimed is:

1. A device for the sea-based culture of sea urchins and abalones, comprising
    two lateral elements, four braces, a plurality of plates, a horizontal tray, and an elongated mesh,
    where the two lateral elements are parallel to each other in the longitudinal direction, where each one of their ends has a groove and a hole for the installation of the four braces, two above and two below,
    where the braces join the lateral elements, leaving a separation between them, where the braces have a center area and two arms on their ends where there are two top braces and two bottom braces, where a top brace mates with a bottom brace, where the center area of each brace has on its interior surface a plurality of parallel and equidistant guides, where the guides mate with the plurality of plates
    where the plurality of plates are vertically inserted into the guides, whereby spaces between the plates permit housing sea urchins or abalones on both faces of each plate, where each plate has a flange at its top and two holes at its base, where each plate comprises two pins, where a pin is inserted through the holes in the base of each plate to attach the plates to the bottom braces;
    where the horizontal tray is secured to the lateral elements, where the horizontal tray comprises two side walls,
    where both the plurality of plates and the tray are enclosed in the elongated mesh, where the elongated mesh has a width equal to the separation of the lateral elements, where the ends of the mesh are joined to the ends of the side walls of the tray.

2. The device for the sea-based culture of sea urchins and abalones set forth of claim 1,
    wherein each lateral element comprises three holes,
    wherein said device has an anchorage to a "mother line", wherein said anchorage has an off-centered anchorage axis through the use of only two of three holes of each lateral element, wherein the two holes are the center hole and a first end hole, and the second end hole remains free.

3. The device for the sea-based culture of sea urchins and abalones set forth of claim 1, wherein the elongated mesh comprises two longer sides, two shorter sides, and a rope, where the rope has two ends, where the rope is passed through edges of both of the longer sides of the elongated mesh and the ends of the rope protrude, and on edges of both of the shorter sides of the elongated mesh a means of joining is installed thereto for closure.

4. The device for the sea-based culture of sea urchins and abalones set forth of claim 1, wherein said horizontal tray consists of two side walls and a bottom or base wall, and where the side walls are attached to lower edges of the lateral elements of the device.

5. The device for the sea-based culture of sea urchins and abalones set forth of claim 4, wherein the elongated mesh forms front and rear walls relative to the horizontal tray, where the elongated mesh encloses the edges of the plates, said mesh being joined at its ends using ropes and a means of joining.

6. The device for the sea-based culture of sea urchins and abalones set forth of claim 5, wherein said horizontal tray is made of fiberglass or thermoformed polyethylene.

7. The device for the sea-based culture of sea urchins and abalones set forth of claim 1, wherein the lateral elements are made of polyethylene material with expanded polystyrene or fiberglass.

8. The device for the sea-based culture of sea urchins and abalones set forth of claim 1, wherein the braces are made of polypropylene or stainless steel, and where each brace comprises 10 guides which are each separated apart by approximately 3 cm, where each guide comprises a groove, where the groove in the guides is about 3 mm wide.

9. The device for the sea-based culture of sea urchins and abalones set forth of claim 1, wherein the plurality of plates is composed of 10 plates constructed of fiberglass of thermoformed polyethylene (PE).

10. The device for the sea-based culture of sea urchins and abalones set forth of claim 1, wherein each plate comprises a plurality of holes.

11. A device for the culture of sea urchins and abalones comprising
two lateral elements, four braces, and a plurality of plates,
where the two lateral elements are parallel to each other, where each lateral element mates with each of the four braces,
where the braces join the lateral elements, leaving a separation between the lateral elements, where each brace has a center area and two arms on its ends, where the center area of each brace has a plurality of parallel and equidistant guides,
where each plate mates with a guide from each brace.

12. The device for the culture of sea urchins and abalones of claim 11, wherein each plate comprises a flange at an uppermost edge and two holes adjacent a lowermost edge.

13. The device for the culture of sea urchins and abalones of claim 12, wherein each plate comprises two pins, where each pin is inserted through one of the holes in the base of each plate to attach the plate to one of the braces.

14. The device for the culture of sea urchins and abalones of claim 11, further comprising a horizontal tray, where the horizontal tray is secured to the lateral elements.

15. The device for the culture of sea urchins and abalones of claim 11, further comprising an elongated mesh, where the plates are enclosed within the elongated mesh.

16. The device for the culture of sea urchins and abalones of claim 11, wherein each lateral element comprises a lower longitudinal fin, where the fin comprises three equidistant holes.

17. The device for the culture of sea urchins and abalones of claim 11, wherein each lateral element is buoyant.

18. The device for the culture of sea urchins and abalones of claim 11, wherein each lateral element comprises a top notched fin, where the top notched fin comprises three equidistant holes.

19. The device for the culture of sea urchins and abalones of claim 18, wherein each lateral element comprises a bottom notched fin, where the bottom notched fin comprises two equidistant holes.

* * * * *